US012764035B2

(12) United States Patent
Guo et al.

(10) Patent No.: US 12,764,035 B2
(45) Date of Patent: Oct. 13, 2026

(54) INFORMATION EXCHANGE METHOD AND RELATED APPARATUS

(71) Applicant: HUAWEI TECHNOLOGIES CO., LTD., Shenzhen (CN)

(72) Inventors: Ziyang Guo, Shenzhen (CN); Peng Liu, Shenzhen (CN); Xun Yang, Singapore (SG); Jiajun Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 18/906,370

(22) Filed: Oct. 4, 2024

(65) Prior Publication Data

US 2025/0030614 A1 Jan. 23, 2025

Related U.S. Application Data

(63) Continuation of application No. PCT/CN2023/083974, filed on Mar. 27, 2023.

(30) Foreign Application Priority Data

Apr. 6, 2022 (CN) ......................... 202210356206.2

(51) Int. Cl.
*H04L 41/16* (2022.01)
*H04W 24/02* (2009.01)

(52) U.S. Cl.
CPC ............. *H04L 41/16* (2013.01); *H04W 24/02* (2013.01)

(58) Field of Classification Search
CPC ........ H04L 41/16; H04W 28/18; H04W 28/22
See application file for complete search history.

(56) References Cited

U.S. PATENT DOCUMENTS 6,947,530 B1 * 9/2005 Barsoum ............... H04L 1/0006 375/364
10,932,183 B1 * 2/2021 Strong .................. H04W 48/12
(Continued)

FOREIGN PATENT DOCUMENTS

CN 116939716 A 10/2023

OTHER PUBLICATIONS

Khastoo et al., NeuRA: Using Neural Networks to Improve WiFi Rate Adaptation, 2020 (Year: 2020).*
(Continued)

*Primary Examiner* — Hieu T Hoang

(57) ABSTRACT

This application relates to an information exchange method and a related apparatus. The method includes: A resource-limited node (for example, a STA) requests to enable an AI-assisted rate adaptation function, and after agreeing to the request, a node with a more powerful function (for example, an AP) sends, to the STA, related information of a neural network (such as a structure, a parameter, an input, and an output of the neural network) that has been trained, so that the STA determines the neural network based on the related information, and performs inference and decision-making based on data observed by the STA, to obtain a rate adaptation decision result. According to embodiments of this application, a basis can be provided for the resource-limited node to implement AI-assisted rate adaptation, and further, performance can be improved.

14 Claims, 13 Drawing Sheets

(56) References Cited

U.S. PATENT DOCUMENTS

| | | | | |
|---|---|---|---|---|
| 2012/0176921 | A1* | 7/2012 | Abraham | H04L 25/0226 370/252 |
| 2012/0281533 | A1* | 11/2012 | Xhafa | H04W 24/08 370/252 |
| 2012/0294255 | A1* | 11/2012 | Seok | H04W 84/12 370/329 |
| 2016/0100328 | A1* | 4/2016 | Lee | H04W 28/0247 370/336 |
| 2017/0331734 | A1* | 11/2017 | Cariou | H04L 45/74 |
| 2020/0260431 | A1* | 8/2020 | Henry | H04W 24/02 |
| 2021/0006603 | A1* | 1/2021 | Park | H04N 21/44209 |
| 2021/0385170 | A1* | 12/2021 | Karjee | H04L 47/24 |
| 2023/0289564 | A1* | 9/2023 | Kim | G06N 3/063 |

OTHER PUBLICATIONS

Queiros et al., Wi-Fi Rate Adaptation using a Simple Deep Reinforcement Learning Approach, Feb. 2022 (Year: 2022).*

Rémy Grünblatt et al:“Simulation and Performance Evaluation of the Intel Rate Adaptation Algorithm”,HAL open science,Oct. 1, 2019,total 9 pages.

Rate Adaptation for 802.11 Wireless Networks: Minstrel,Jan. 30, 2010,URL:https://blog.cerowrt.org/papers/minstrel-sigcomm-final.pdf,total 14 pages.

* cited by examiner

| | | | |
|---|---|---|---|
| Element identifier element ID | Length length | Element identifier extension element ID extension | AI function request bitmap (or AI function request field) |

INFORMATION EXCHANGE METHOD AND RELATED APPARATUS

CROSS-REFERENCE TO RELATED APPLICATIONS

This application is a continuation of International Application No. PCT/CN2023/083974, filed on Mar. 27, 2023, which claims priority to Chinese Patent Application No. 202210356206.2, filed on Apr. 6, 2022. The disclosures of the aforementioned applications are hereby incorporated by reference in their entireties.

TECHNICAL FIELD

This application relates to the field of wireless communication technologies, and in particular, to an information exchange method and a related apparatus.

BACKGROUND

A rate adaptation algorithm is a core algorithm in a wireless network such as short-range communication or Wi-Fi, and aims to select different modulation and coding schemes (MCS), channel bandwidths, or numbers of multiple input multiple output (MIMO) streams based on a current channel state, to change a data sending rate, so as to improve transmission performance of a system. A conventional rate adaptation algorithm is usually designed based on experience, and a parameter of the conventional rate adaptation algorithm is manually selected. Therefore, the conventional rate adaptation algorithm has disadvantages such as poor transmission performance and poor adaptability.

With the development of artificial intelligence (AI) technologies, an AI-based rate adaptation algorithm is widely studied, and can implement data-driven parameter selection and effectively improve transmission performance. Specifically, the AI-based rate adaptation algorithm mainly uses a prediction capability of a neural network to select a rate based on observation information (for example, channel information) collected by a node. Compared with the conventional rate adaptation algorithms, the AI-based rate adaptation algorithm has an obvious performance gain.

However, because neural network training requires large computing power and high energy consumption, resource-limited nodes (for example, a mobile device that is usually powered by a battery) in a network cannot complete neural network training by the resource-limited nodes. Therefore, the resource-limited nodes cannot use the AI-based rate adaptation algorithm to improve performance.

SUMMARY

Embodiments of this application provide an information exchange method and a related apparatus, so that a resource-limited node (for example, a station) in a network can obtain related information of a neural network (for example, a function, a structure, a parameter, an input, and an output that are of the neural network) that has been trained by a node with a more powerful function (for example, an access point) in the network. This provides a basis for the resource-limited node to implement AI-assisted rate adaptation or AI-assisted rate adaptation joint channel access. Further, the resource-limited node in the network may perform AI-assisted rate adaptation or AI-assisted rate adaptation joint channel access by using the neural network that has been trained by the node with the more powerful function in the network, to improve performance.

The following describes this application from different aspects. It should be understood that, for the following implementations and beneficial effects of different aspects, refer to each other.

According to a first aspect, this application provides an information exchange method. The method includes: A first communication apparatus sends function request information, where the function request information is used to request to enable an AI-assisted rate adaptation function or an AI-assisted rate adaptation joint channel access function; and the first communication apparatus receives function response information, where the function response information is used to respond to (that is, agree to or reject) a request of the function request information.

The first communication apparatus in this application sends the function request information to a second communication apparatus, to request to enable an AI-assisted related function, and the second communication apparatus replies with the corresponding function response information, so that the first communication apparatus determines, based on the function response information, whether to enable the AI-assisted related function. This can provide a basis for the first communication apparatus to implement AI-assisted rate adaptation or AI-assisted rate adaptation joint channel access.

With reference to the first aspect, in a possible implementation, the function response information indicates that the request of the function request information is agreed; and after the first communication apparatus receives the function response information, the method further includes: The first communication apparatus receives a first frame, where the first frame includes first indication information, the first indication information indicates input information of a neural network, and the neural network corresponds to the function that is requested to be enabled by the function request information.

With reference to the first aspect, in a possible implementation, the function response information indicates that the request of the function request information is agreed; and after the first communication apparatus receives the function response information, the method further includes: The first communication apparatus receives a second frame, where the second frame includes third indication information, the third indication information indicates at least one of an output layer structure of the neural network and a manner of selecting a decision result of the neural network, and the neural network corresponds to the function that is requested to be enabled by the function request information.

Optionally, the output layer structure of the neural network includes one or more of the following: a number of neurons or an activation function used by a neuron.

It should be understood that the neural network in this application includes an input layer, an output layer, and a hidden layer. The input layer may be determined based on the foregoing input information, and the hidden layer may be preset.

"Predefine" and "preset" in this application may be understood as "define", "predefine", "store", "pre-store", "pre-negotiate", "pre-configure", "solidify", "pre-burn", or the like.

With reference to the first aspect, in a possible implementation, the function response information indicates that the request of the function request information is agreed; and after the first communication apparatus receives the function response information, the method further includes: The first communication apparatus receives a parameter of the neural network, where the parameter of the neural network includes at least one of a bias and a weight that are of a neuron, and the neural network corresponds to the function that is requested to be enabled by the function request information.

With reference to the first aspect, in a possible implementation, the function response information indicates that a request of the function request information is rejected; and after the first communication apparatus receives the function response information, the method further includes: The first communication apparatus performs communication by using a conventional rate adaptation algorithm and conventional channel access. The conventional rate adaptation algorithm includes but is not limited to a sampling-based Minstrel or Iwl-mvm-rs algorithm. The conventional channel access includes but is not limited to carrier sense multiple access with collision avoidance (CSMA/CA).

In this application, the neural network corresponds to an AI-assisted related function. In other words, the neural network is configured to implement or support the AI-assisted related function. It may be understood that the neural network in this application may be trained by another communication apparatus (which is a communication apparatus other than the first communication apparatus in a network, for example, the second communication apparatus), so that the neural network can implement or support the AI-assisted related function. The AI-assisted related function includes one or more of the following: the AI-assisted rate adaptation function and the AI-assisted rate adaptation joint channel access function. Optionally, the AI-assisted related function may further include one or more of the following: an AI-assisted channel access function, an AI-assisted channel aggregation function, or an AI-assisted channel aggregation joint channel access function.

According to a second aspect, this application provides an information exchange method. The method includes: A second communication apparatus receives function request information, where the function request information is used to request to enable an AI-assisted rate adaptation function or an AI-assisted rate adaptation joint channel access function; and the second communication apparatus sends function response information, where the function response information is used to respond to (that is, agree to or reject) a request of the function request information.

With reference to the second aspect, in a possible implementation, the function response information indicates that the request of the function request information is agreed; and after the second communication apparatus sends the function response information, the method further includes: The second communication apparatus sends a first frame, where the first frame includes first indication information, the first indication information indicates input information of a neural network, and the neural network corresponds to the function that is requested to be enabled by the function request information.

With reference to the second aspect, in a possible implementation, the function response information indicates that the request of the function request information is agreed; and after the second communication apparatus sends the function response information, the method further includes: The second communication apparatus sends a second frame, where the second frame includes third indication information, the third indication information indicates at least one of an output layer structure of the neural network and a manner of selecting a decision result of the neural network, and the neural network corresponds to the function that is requested to be enabled by the function request information.

Optionally, the output layer structure of the neural network includes one or more of the following: a number of neurons or an activation function used by a neuron.

With reference to the second aspect, in a possible implementation, the function response information indicates that the request of the function request information is agreed; and after the second communication apparatus sends the function response information, the method further includes: The second communication apparatus sends a parameter of the neural network, where the parameter of the neural network includes at least one of a bias and a weight that are of a neuron, and the neural network corresponds to the function that is requested to be enabled by the function request information.

In this application, when the second communication apparatus agrees to the request of the first communication apparatus, the second communication apparatus notifies the first communication apparatus of related information of the neural network that has been trained by the second communication apparatus, for example, the input information, the output layer structure, or the parameter of the neural network, so that the first communication apparatus may restore the neural network based on the information. In addition, this can provide a basis for the first communication apparatus to perform AI-assisted rate adaptation or AI-assisted rate adaptation joint channel access by using the neural network.

In a possible implementation of any one of the foregoing aspects, the function request information is carried in an information element, or carried in an aggregated control (A-control) subfield of a high throughput (HT) control field.

In a possible implementation of any one of the foregoing aspects, when the function response information indicates that the request of the function request information is agreed, the function response information may further include the parameter of the neural network. The parameter of the neural network includes at least one of a bias and a weight that are of a neuron. The neural network corresponds to the function that is requested to be enabled by the function request information.

In a possible implementation of any one of the foregoing aspects, when the function response information indicates that the request of the function request information is agreed, the function response information may further include fourth indication information indicating a hidden layer structure of the neural network. The neural network corresponds to the function that is requested to be enabled by the function request information.

In embodiments of this application, the hidden layer structure is indicated, so that a design for the hidden layer structure of the neural network can be more flexible.

In a possible implementation of any one of the foregoing aspects, the input information of the neural network includes one or more of the following: a carrier sense result, received power, an MCS used for a data packet, a number of MIMO data streams, a channel bandwidth, a queuing delay, an access delay, channel access behavior, a data packet transmission result, or channel information.

Optionally, the input information of the neural network further includes one or more of the following: a packet loss rate, a throughput, or a duration from a current moment to time of previous successful transmission of the first communication apparatus.

The carrier sense result may be busy or idle of a channel, or may be a received signal strength indicator (RSSI). The queuing delay may be a time interval from time at which a data packet enters a sending queue to time at which the data packet is sent. The access delay may be a time interval from time at which a data packet is sent to time at which the data packet is successfully sent. The channel access behavior may refer to one of two types of behavior: access and non-access. The data packet transmission result includes transmission success and transmission failure. The channel information may be channel state information (CSI), or may be a signal to noise ratio (SNR). Meanings of various types of input information are not described in other aspects.

In a possible implementation of any one of the foregoing aspects, the first frame further includes second indication information that indicates a number of pieces of input information of the neural network, or indicates a number of pieces of or a length of input information of the neural network within a predetermined duration. The second indication information may be further understood as indicating a historical number of pieces of input information included in the neural network, a total length of the input information, or a length of each type of input information. For example, it is assumed that the input information indicated by the first indication information is a carrier sense result and received power, and a number or a length indicated by the second indication information is T. In this case, a total of T carrier sense results and T pieces of received power are required for an input of the neural network.

Optionally, the input layer structure of the neural network includes a number of neurons at the input layer. The number of neurons at the input layer may be determined based on a number of neurons corresponding to each type of input information (which may be preset or may be indicated) and a number of pieces of/a length of input information of the neural network. Therefore, in embodiments of this application, the number of pieces of input information of the neural network is indicated in the first frame, so that after receiving the first frame, the first communication apparatus may determine the input layer structure of the neural network based on the first frame.

In a possible implementation of any one of the foregoing aspects, the first frame further includes information that indicates a dimension of the input information, where the information is denoted as information A. The information A may also be understood as indicating a number of neurons corresponding to the input information. The dimension of the input information may be equal to the number of neurons corresponding to the input information.

In a possible implementation of any one of the foregoing aspects, the first frame further includes information B that indicates whether the first indication information exists.

According to a third aspect, an embodiment of this application provides a first communication apparatus that is configured to perform the method according to any one of the first aspect or the possible implementations of the first aspect. The first communication apparatus includes units that are capable of performing the method according to any one of the first aspect or the possible implementations of the first aspect.

According to a fourth aspect, an embodiment of this application provides a second communication apparatus that is configured to perform the method according to any one of the second aspect or the possible implementations of the second aspect. The second communication apparatus includes units that are capable of performing the method according to any one of the second aspect or the possible implementations of the second aspect.

In the third aspect or the fourth aspect, the first communication apparatus and the second communication apparatus may include a transceiver unit and a processing unit. For specific descriptions of the transceiver unit and the processing unit, refer to apparatus embodiments provided below.

According to a fifth aspect, this application provides an information exchange method. The method includes: A second communication apparatus generates and sends a first frame, where the first frame includes first indication information, the first indication information indicates input information of a neural network; and the neural network corresponds to an AI-assisted rate adaptation function or an AI-assisted rate adaptation joint channel access function.

When there is no request, the second communication apparatus in this application also notifies another node in a network of the input information of the neural network that has been trained by the second communication apparatus. This can provide a basis for a resource-limited node (for example, a first communication apparatus) in the network to implement AI-assisted rate adaptation or AI-assisted rate adaptation joint channel access.

With reference to the fifth aspect, in a possible implementation, the method further includes: The second communication apparatus sends a second frame, where the second frame includes third indication information that indicates at least one of an output layer structure of the neural network and a manner of selecting a decision result of the neural network.

Optionally, the output layer structure of the neural network includes one or more of the following: a number of neurons or an activation function used by a neuron.

In this case, a hidden layer structure may be preset, or may be indicated in the first frame or the second frame. For details, refer to descriptions in the following embodiments.

With reference to the fifth aspect, in a possible implementation, the method further includes: The second communication apparatus sends a parameter of the neural network, where the parameter of the neural network includes at least one of a bias and a weight that are of a neuron.

According to a sixth aspect, this application provides an information exchange method. The method includes: A first communication apparatus receives a first frame, where the first frame includes first indication information, and the first indication information indicates input information of a neural network; and the first communication apparatus determines, based on an indication of the first indication information in the first frame, at least one of the input information of the neural network and an input layer structure of the neural network. The neural network corresponds to an AI-assisted rate adaptation function or an AI-assisted rate adaptation joint channel access function.

With reference to the sixth aspect, in a possible implementation, the method further includes: The first communication apparatus receives a second frame, where the second frame includes third indication information that indicates at least one of an output layer structure of the neural network and a manner of selecting a decision result of the neural network.

Optionally, the output layer structure of the neural network includes one or more of the following: a number of neurons or an activation function used by a neuron.

With reference to the sixth aspect, in a possible implementation, the method further includes: The first communication apparatus receives a parameter of the neural network, where the parameter of the neural network includes at least one of a bias and a weight that are of a neuron.

With reference to the fifth aspect or the sixth aspect, in a possible implementation, the input information of the neural network includes one or more of the following: a carrier sense result, received power, an MCS used for a data packet, a number of MIMO data streams, a channel bandwidth, a queuing delay, an access delay, channel access behavior, a data packet transmission result, or channel information.

For example, when the neural network corresponds to the AI-assisted rate adaptation function, the input information of the neural network includes but is not limited to one or more of the following: the carrier sense result, the received power, the MCS used for the data packet, the number of MIMO data streams, the channel bandwidth, the queuing delay, the access delay, the data packet transmission result, or the channel information.

Correspondingly, the decision result of the neural network includes but is not limited to one or more of the following: an MCS to be used for transmission, a number of MIMO data streams to be used for transmission, or a channel bandwidth to be used for transmission.

For example, when the neural network corresponds to the AI-assisted rate adaptation joint channel access function, the input information of the neural network is not limited to one or more of the following: the carrier sense result, the received power, the MCS used for the data packet, the number of MIMO data streams, the channel bandwidth, the queuing delay, the access delay, the channel access behavior, the data packet transmission result, or the channel information.

Correspondingly, the decision result of the neural network includes but is not limited to one or more of the following: non-access, an MCS to be used for access, a number of MIMO data streams to be used for transmission, or a channel bandwidth to be used for transmission.

It should be understood that when the neural network shown in the foregoing example corresponds to different functions, content of the input information and content of the decision result are also applicable to other aspects.

Optionally, the input information of the neural network further includes one or more of the following: a packet loss rate, a throughput, or a duration from a current moment to time of previous successful transmission of the first communication apparatus.

With reference to the fifth aspect or the sixth aspect, in a possible implementation, the first frame further includes second indication information that indicates a number of pieces of input information of the neural network or indicates a number of pieces of or a length of input information of the neural network within a predetermined duration. The second indication information may be further understood as indicating a historical number of pieces of input information included in the neural network, a total length of the input information, or a length of each type of input information.

Optionally, the input layer structure of the neural network includes a number of neurons at the input layer. The number of neurons at the input layer may be determined based on a number of neurons corresponding to each type of input information (which may be preset or may be indicated) and a number of pieces of/a length of input information of the neural network. Therefore, in this application, the number of pieces of input information of the neural network is indicated in the first frame, so that after receiving the first frame, the first communication apparatus may determine the input layer structure of the neural network based on the first frame.

With reference to the fifth aspect or the sixth aspect, in a possible implementation, the first frame further includes information indicating a dimension of the input information, where the information is denoted as information A. The information A may also be understood as indicating a number of neurons corresponding to the input information. The dimension of the input information may be equal to the number of neurons corresponding to the input information.

With reference to the fifth aspect or the sixth aspect, in a possible implementation, the first frame further includes information B indicating whether the first indication information exists.

According to a seventh aspect, an embodiment of this application provides a second communication apparatus that is configured to perform the method according to any one of the fifth aspect or the possible implementations of the fifth aspect. The second communication apparatus includes units that are capable of performing the method according to any one of the fifth aspect or the possible implementations of the fifth aspect.

According to an eighth aspect, an embodiment of this application provides a first communication apparatus that is configured to perform the method according to any one of the sixth aspect or the possible implementations of the sixth aspect. The first communication apparatus includes units that are capable of performing the method according to any one of the sixth aspect or the possible implementations of the sixth aspect.

In the seventh aspect or the eighth aspect, the first communication apparatus and the second communication apparatus may include a transceiver unit and a processing unit. For specific descriptions of the transceiver unit and the processing unit, refer to apparatus embodiments provided below.

According to a ninth aspect, this application provides an information exchange method. The method includes: A second communication apparatus generates and sends a second frame, where the second frame includes third indication information, and the third indication information indicates at least one of an output layer structure of a neural network and a manner of selecting a decision result of the neural network. The neural network corresponds to an AI-assisted rate adaptation function or an AI-assisted rate adaptation joint channel access function.

In this case, a correspondence between AI-assisted functions and input information of the neural network is predefined, that is, one or more AI-assisted functions separately correspond to the input information. An input layer structure of the neural network may be determined based on a number of neurons corresponding to each type of input information and a number of pieces of/a length of input information of the neural network. The number of neurons corresponding to each type of input information and the number pieces of/the length of input information of the neural network may be preset or defined in a standard protocol.

A hidden layer structure of the neural network may be preset, or may be indicated in the second frame. For details, refer to descriptions in the following embodiments.

When there is no request, the second communication apparatus in this application also notifies another node in a network of at least one of the output layer structure or the manner of selecting the decision result of the neural network that has been trained by the second communication apparatus. This can provide a basis for a resource-limited node (for example, a first communication apparatus) in the network to implement AI-assisted rate adaptation or AI-assisted rate adaptation joint channel access.

With reference to the ninth aspect, in a possible implementation, the method further includes: The second communication apparatus sends a parameter of the neural network, where the parameter of the neural network includes at least one of a bias and a weight that are of a neuron.

According to a tenth aspect, this application provides an information exchange method. The method includes: A first communication apparatus receives a second frame, where the second frame includes third indication information, and the third indication information indicates at least one of an output layer structure of a neural network and a manner of selecting a decision result of the neural network; and the first communication apparatus determines, based on an indication of the third indication information in the second frame, at least one of the output layer structure of the neural network and the manner of selecting the decision result of the neural network. The neural network corresponds to an AI-assisted rate adaptation function or an AI-assisted rate adaptation joint channel access function.

With reference to the tenth aspect, in a possible implementation, the method further includes: The first communication apparatus receives a parameter of the neural network, where the parameter of the neural network includes at least one of a bias and a weight that are of a neuron.

With reference to the ninth aspect or the tenth aspect, in a possible implementation, the output layer structure of the neural network includes one or more of the following: a number of neurons or an activation function used by a neuron.

According to an eleventh aspect, an embodiment of this application provides a second communication apparatus that is configured to perform the method according to any one of the ninth aspect or the possible implementations of the ninth aspect. The second communication apparatus includes units that are capable of performing the method according to any one of the tenth aspect or the possible implementations of the tenth aspect.

According to a twelfth aspect, an embodiment of this application provides a first communication apparatus that is configured to perform the method according to any one of the tenth aspect or the possible implementations of the tenth aspect. The first communication apparatus includes units that are capable of performing the method according to any one of the tenth aspect or the possible implementations of the tenth aspect.

In the eleventh aspect or the twelfth aspect, the first communication apparatus and the second communication apparatus may include a transceiver unit and a processing unit. For specific descriptions of the transceiver unit and the processing unit, refer to apparatus embodiments provided below.

According to a thirteenth aspect, this application provides an AI-assisted rate adaptation method. The method includes: A first communication apparatus obtains input information of a neural network, where the neural network corresponds to an AI-assisted rate adaptation function or an AI-assisted rate adaptation joint channel access function; the first communication apparatus obtains a structure and a parameter that are of the neural network, and determines the neural network based on the structure and the parameter that are of the neural network; and the first communication apparatus obtains T monitored datasets, and inputs the T datasets into the neural network for processing, to obtain a rate adaptation decision result or a rate adaptation joint channel access decision result. One dataset includes one or more pieces of data, and one piece of data corresponds to one type of input information.

The first communication apparatus in this application performs AI-assisted rate adaptation or AI-assisted rate adaptation joint channel access by using a neural network that has been trained by another communication apparatus (for example, a second communication apparatus), to improve performance. In addition, the first communication apparatus does not need to train the neural network. This reduces energy consumption of the first communication apparatus.

With reference to the thirteenth aspect, in a possible implementation, before the first communication apparatus obtains the input information of the neural network, the method further includes: The first communication apparatus determines to enable the AI-assisted rate adaptation function or the AI-assisted rate adaptation joint channel access function.

With reference to the thirteenth aspect, in a possible implementation, the method further includes: The first communication apparatus obtains a manner of selecting a decision result of the neural network; and inputting the T datasets into the neural network for processing, to obtain the rate adaptation decision result or the rate adaptation joint channel access decision result includes: inputting the T datasets into the neural network for processing to obtain a processing result, and selecting the rate adaptation decision result or the rate adaptation joint channel access decision result from the processing result.

With reference to the thirteenth aspect, in a possible implementation, the structure of the neural network includes an input layer structure, an output layer structure, and a hidden layer structure.

Optionally, that the first communication apparatus obtains the structure of the neural network includes: The first communication apparatus determines the input layer structure of the neural network based on the input information of the neural network, and obtains the output layer structure and the hidden layer structure that are of the neural network.

According to a fourteenth aspect, an embodiment of this application provides a first communication apparatus that is configured to perform the method according to any one of the thirteenth aspect or the possible implementations of the thirteenth aspect. The first communication apparatus includes units that are capable of performing the method according to any one of the thirteenth aspect or the possible implementations of the thirteenth aspect.

In the fourteenth aspect, the first communication apparatus may include a transceiver unit and a processing unit. For specific descriptions of the transceiver unit and the processing unit, refer to apparatus embodiments provided below.

According to a fifteenth aspect, an embodiment of this application provides a first communication apparatus. The first communication apparatus includes a processor that is configured to perform the method according to any one of the first aspect, the sixth aspect, the tenth aspect, the thirteenth aspect, or the possible implementations of any one of the aspects. Alternatively, the processor is configured to execute a program stored in the memory, and when the program is executed, the method according to the first aspect, the sixth aspect, the tenth aspect, the thirteenth aspect, or the possible implementations of the aspects is performed.

With reference to the fifteenth aspect, in a possible implementation, the memory is located outside the first communication apparatus.

With reference to the fifteenth aspect, in a possible implementation, the memory is located in the first communication apparatus.

In this embodiment, the processor and the memory may alternatively be integrated into one device. In other words, the processor and the memory may alternatively be integrated together.

With reference to the fifteenth aspect, in a possible implementation, the first communication apparatus further includes a transceiver, and the transceiver is configured to receive a signal or send a signal.

According to a sixteenth aspect, an embodiment of this application provides a second communication apparatus. The second communication apparatus includes a processor that is configured to perform the method according to any one of the second aspect, the fifth aspect, the ninth aspect, or the possible implementations of any one of the aspects. Alternatively, the processor is configured to execute a program stored in a memory, and when the program is executed, the method according to any one of the second aspect, the fifth aspect, the ninth aspect, or the possible implementations of the aspects is performed.

With reference to the sixteenth aspect, in a possible implementation, the memory is located outside the second communication apparatus.

With reference to the sixteenth aspect, in a possible implementation, the memory is located in the second communication apparatus.

In this embodiment, the processor and the memory may alternatively be integrated into one device. In other words, the processor and the memory may alternatively be integrated together.

With reference to the sixteenth aspect, in a possible implementation, the second communication apparatus further includes a transceiver, and the transceiver is configured to receive a signal or send a signal.

According to a seventeenth aspect, an embodiment of this application provides a first communication apparatus. The first communication apparatus includes a logic circuit and an interface, and the logic circuit is coupled to the interface.

In an example embodiment, the logic circuit is configured to obtain function request information, where the function request information is used to request to enable an AI-assisted rate adaptation function or an AI-assisted rate adaptation joint channel access function; and the interface is configured to: output the function request information, and input function response information, where the input function response information is used to response to the function request information.

In an example embodiment, the interface is configured to input a first frame, where the first frame includes first indication information, and the first indication information indicates input information of a neural network; and the logic circuit is configured to determine, based on an indication of the first indication information in the first frame, at least one of the input information of the neural network and an input layer structure of the neural network. The neural network corresponds to the AI-assisted rate adaptation function or the AI-assisted rate adaptation joint channel access function.

In an example embodiment, the interface is configured to input a second frame, where the second frame includes third indication information, and the third indication information indicates at least one of an output layer structure of a neural network and a manner of selecting a decision result of the neural network; and the logic circuit is configured to determine, based on an indication of the third indication information in the second frame, at least one of the output layer structure of the neural network and the manner of selecting the decision result of the neural network. The neural network corresponds to the AI-assisted rate adaptation function or the AI-assisted rate adaptation joint channel access function.

In an example embodiment, the logic circuit is configured to: obtain input information of a neural network, where the neural network corresponds to an AI-assisted rate adaptation function or an AI-assisted rate adaptation joint channel access function, and obtain a structure of the neural network; the interface is configured to input a parameter of the neural network; the logic circuit is further configured to determine the neural network based on the structure and the parameter that are of the neural network; and the logic circuit is further configured to: obtain T monitored datasets, and input the T datasets into the neural network for processing, to obtain a rate adaptation decision result or a rate adaptation joint channel access decision result, where one dataset includes one or more pieces of data, and one piece of data corresponds to one type of input information.

According to an eighteenth aspect, an embodiment of this application provides a second communication apparatus. The second communication apparatus includes a logic circuit and an interface, and the logic circuit is coupled to the interface.

In an example embodiment, the interface is configured to input function request information, where the function request information is used to request to enable an AI-assisted rate adaptation function or an AI-assisted rate adaptation joint channel access function; the logic circuit is configured to obtain function response information, where the function response information is used to respond to a request of the function request information; and interface is configured to output the function response information.

In an example embodiment, the logic circuit is configured to generate a first frame, where the first frame includes first indication information, and the first indication information indicates input information of a neural network; and the interface is configured to output the first frame. The neural network corresponds to the AI-assisted rate adaptation function or the AI-assisted rate adaptation joint channel access function.

In an example embodiment, the logic circuit is configured to generate a second frame, where the second frame includes third indication information, and the third indication information indicates at least one of an output layer structure of a neural network and a manner of selecting a decision result of the neural network; and the interface is configured to output the second frame. The neural network corresponds to the AI-assisted rate adaptation function or the AI-assisted rate adaptation joint channel access function.

According to a nineteenth aspect, an embodiment of this application provides a computer-readable storage medium. The computer-readable storage medium is configured to store a computer program, and when the computer program runs on a computer, the method according to any one of the first aspect, the sixth aspect, the tenth aspect, the thirteenth aspect, or the possible implementations of any one of the aspects is performed.

According to a twentieth aspect, an embodiment of this application provides a computer-readable storage medium. The computer-readable storage medium is configured to store a computer program, and when the computer program runs on a computer, the method according to any one of the second aspect, the fifth aspect, the ninth aspect, or the possible implementations of any one of the aspects is performed.

According to a twenty-first aspect, an embodiment of this application provides a computer program product. The computer program product includes a computer program or computer code, and when the computer program product runs on a computer, the method according to any one of the first aspect, the sixth aspect, the tenth aspect, the thirteenth aspect, or the possible implementations of any one of the aspects is performed.

According to a twenty-second aspect, an embodiment of this application provides a computer program product. The computer program product includes a computer program or computer code, and when the computer program product runs on a computer, the method according to the second aspect, the fifth aspect, the ninth aspect, or the possible implementations of the aspects is performed.

According to a twenty-third aspect, an embodiment of this application provides a computer program. When the computer program is run on a computer, the method according to any one of the first aspect, the sixth aspect, the tenth aspect, the thirteenth aspect, or the possible implementations of the aspects is performed.

According to a twenty-fourth aspect, an embodiment of this application provides a computer program. When the computer program is run on a computer, the method according to the second aspect, the fifth aspect, the ninth aspect, or the possible implementations of the aspects is performed.

According to a twenty-fifth aspect, an embodiment of this application provides a wireless communication system. The wireless communication system includes a first communication apparatus and a second communication apparatus. The first communication apparatus is configured to perform the method according to the first aspect, the sixth aspect, the tenth aspect, the thirteenth aspect, or the possible implementations of the aspects. The second communication apparatus is configured to perform the method according to the second aspect, the fifth aspect, the ninth aspect, or the possible implementations of the aspects.

Embodiments of this application are implemented, so that a basis can be provided for a resource-limited node to implement AI-assisted rate adaptation or AI-assisted rate adaptation joint channel access. Further, the resource-limited node in a network may perform AI-assisted rate adaptation or AI-assisted rate adaptation joint channel access by using a neural network that has been trained by a node with a more powerful function in the network, to improve performance.

BRIEF DESCRIPTION OF DRAWINGS

To describe technical solutions of embodiments of this application more clearly, the following briefly describes accompanying drawings used for describing embodiments.

DESCRIPTION OF EMBODIMENTS

Figure 1:
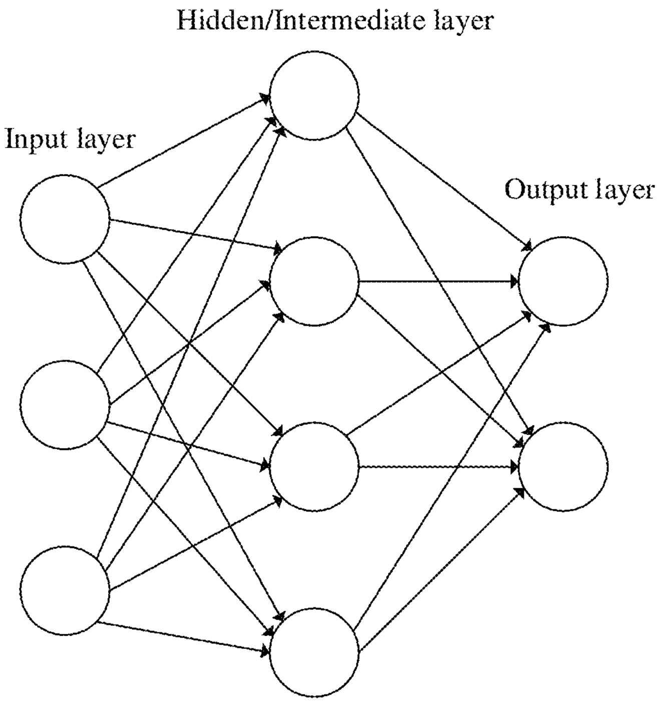
FIG. 1 is a diagram of an example fully connected neural network including three layers.

The following clearly and completely describes technical solutions in embodiments of this application with reference to accompanying drawings in embodiments of this application.

In this application, the terms "first", "second", and the like are intended to distinguish between different objects but do not indicate a particular order. In addition, terms "include" and "have" and any other variations thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In descriptions of this application, "at least one (item)" means one or more, "a plurality of" means two or more, and "at least two (items)" means two, three, or more. In addition, the term "and/or" is used for describing an association relationship between associated objects, and represents that any one of three relationships may exist. For example, "A and/or B" may represent any one of the following three cases: Only A exists, only B exists, or both A and B exist, where A and B may be singular or plural. The character "/" usually indicates an "or" relationship between associated objects. "At least one of the following items (pieces)" or a similar expression thereof means any combination of these items. For example, at least one item (piece) of a, b, or c may represent: a, b, c, "a and b", "a and c", "b and c", or "a, b, and c".

In this application, the term "example", "for example", or the like is used to represent giving an example, an illustration, or a description. Any embodiment or design scheme described with "example", "in an example", or "for example" in this application should not be explained as being more preferred or having more advantages than another embodiment or design scheme. Exactly, use of the term "example", "in an example", "for example", or the like is intended to present a related concept in a specific manner.

It should be understood that, in this application, "when", "in a case of", and "if" mean that an apparatus performs corresponding processing in an objective situation, and are not intended to limit time, and the apparatus is not necessarily required to have a determining action during implementation, and do not mean any other limitation.

In this application, an element represented in a singular form is intended to represent "one or more", but does not represent "one and only one", unless otherwise specified.

It should be understood that in embodiments of this application, "B corresponding to A" indicates that B is associated with A, and B may be determined based on A. However, it should be further understood that determining B based on A does not mean that B is determined based only on A, and B may alternatively be determined based on A and/or other information.

A neural network (NN) is a machine learning technology that simulates a human brain neural network to implement functions similar to artificial intelligence. The neural network includes at least three layers: an input layer, an intermediate layer (also referred to as a hidden layer), and an output layer. Some neural networks may include more hidden layers between the input layer and the output layer. An internal structure and an implementation that are of the neural network are described by using a simplest neural network as an example. FIG. 1 is a diagram of a fully connected neural network including three layers. As shown in FIG. 1, the neural network includes three layers: an input layer, a hidden layer, and an output layer, the input layer has three neurons, the hidden layer has four neurons, the output layer has two neurons, and neurons at each layer are fully connected to neurons at a next layer. Each connection line between neurons corresponds to a weight, and these weights may be updated through training. Each neuron at the hidden layer and each neuron at the output layer each may further correspond to a bias, and these biases may be updated through training. Updating the neural network means updating these weights and biases. All information about the neural network is known after a structure of the neural network, that is, a number of neurons included in each layer, how an output of a previous neuron is input into a subsequent neuron (that is, a connection relationship between neurons), and a parameter of the neural network, that is, the weights and the biases, is known.

Figure 2:
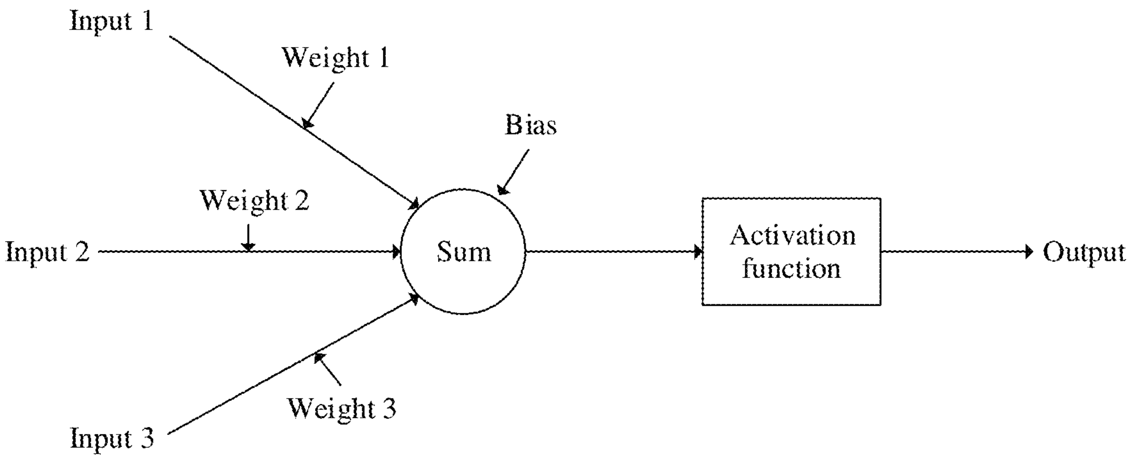
FIG. 2 is a diagram of example calculating an output by a neuron based on inputs.

It can be seen from FIG. 1 that each neuron may have a plurality of input connection lines, and each neuron calculates an output based on an input. FIG. 2 is a diagram of calculating an output by a neuron based on inputs. As shown in FIG. 2, one neuron includes three inputs, one output, and two computing functions, and an output calculation formula may be represented as follows:

$$\text{Output}=\text{Activation function}(\text{input }1*\text{weight }1+\text{input }2*\text{weight }2+\text{input }3*\text{weight }3+\text{bias}) \quad (1\text{-}1).$$

The symbol "*" represents a mathematical operation "multiplying" or "multiplication".

Each neuron may have a plurality of output connection lines, and an output of one neuron is used as an input of a subsequent neuron. It should be understood that the input layer has only an output connection line, each neuron at the input layer is a value input into the neural network, and an output value of each neuron is directly used as an input of all output connection lines. The output layer has only an input connection line, and an output is calculated according to the foregoing formula (1-1). Optionally, calculation of the activation function may not occur at the output layer, that is, the foregoing formula (1-1) may be transformed into: Output=Input 1*weight 1+input 2*weight 2+input 3*weight 3+bias.

For example, a k-layer neural network may be represented as:

$$y=f_k(f_{k-1}(\ldots(f_1(w_1*x+b_1))) \quad (1\text{-}2).$$

x represents an input of the neural network, y represents an output of the neural network, $w_i$ represents a weight of an $i^{th}$ layer neural network, $b_i$ represents a bias of the $i^{th}$ layer neural network, and $f_1$ represents an activation function of the $i^{th}$ layer neural network. i=1, 2, . . . , and k.

The method provided in this application may be applied to a wireless local area network (WLAN) system, for example, Wi-Fi. The method provided in this application may be applicable to the institute of electrical and electronics engineers (IEEE) 802.11 series protocols, for example, the 802.11a/b/g protocol, the 802.11n protocol, the 802.11ac protocol, the 802.11ax protocol, the 802.11be protocol, the Wi-Fi 7, or a next-generation protocol, for example, Wi-Fi 8. Examples are not enumerated herein. The method provided in this application may be further applied to various communication systems, for example, a cellular system (including but not limited to a long term evolution (LTE) system, a 5th generation (5G) communication system, and a new communication system emerging in future communication development (such as 6G)), an internet of things (IoT) system, a narrowband internet of things (NB-IoT) system, another short-range communication system (including but not limited to Bluetooth and an ultra wide band (UWB)), and the like.

The method provided in this application may be applied to a scenario in which one node performs data transmission with one or more nodes, for example, single-user uplink/downlink transmission, multi-user uplink/downlink transmission, and device-to-device (D2D) transmission. Any one of the foregoing nodes may be a communication apparatus in a wireless communication system. In other words, the method provided in this application may be implemented by the communication apparatus in the wireless communication system. For example, the communication apparatus may be at least one of an access point (AP) or a station (STA).

Optionally, all communication apparatuses (APs and STAs) in this application have an AI capability, that is, using a neural network to perform inference and decision-making, but only some communication apparatuses (for example, the APs) may perform neural network training. In other words, in addition to a wireless communication function, the communication apparatuses in this application have an AI processing capability, that is, support inference and decision-making of a neural network.

The access point in this application is an apparatus that has a wireless communication function and an AI processing capability, supports communication or sensing by using a WLAN protocol, and has a function of communicating with or sensing another device (for example, a station or another access point) in a WLAN network. Certainly, the access point may further have a function of communicating with or sensing another device. Alternatively, the access point is equivalent to a bridge that connects a wired network and a wireless network, and a main function of the access point is to connect various wireless network clients together and then connect the wireless network to the Ethernet. In a WLAN system, the access point may be referred to as an access point station (AP STA). The apparatus having the wireless communication function may be an entire device, or may be a chip or a processing system installed in an entire device. The device in which the chip or the processing system is installed may implement methods and functions in embodiments of this application under control of the chip or the processing system. The AP in embodiments of this application is an apparatus that provides a service for the STA, and may support 802.11 series protocols. For example, the access point may be an access point for a terminal (for example, a mobile phone) to access a wired (or wireless) network, and is mainly deployed in a home, a building, and a campus. A typical coverage radius is tens of meters to hundreds of meters. Certainly, the access point may alternatively be deployed outdoors. For another example, the AP may be a communication entity, for example, a communication server, a router, a switch, or a bridge, or the AP may include various forms of macro base stations, micro base stations, relay stations, and the like. Certainly, the AP may alternatively be a chip or a processing system in these devices in various forms, to implement methods and functions in embodiments of this application. The access point in this application may be an extremely high throughput (EHT) AP, an access point of a future Wi-Fi standard, or the like.

The station in this application is an apparatus that has a wireless communication function and an AI processing capability, supports communication or sensing by using a WLAN protocol, and has a capability of communicating with or sensing another station or access point in the WLAN network. In the WLAN system, the station may be referred to as a non-access point station (non-AP STA). For example, the STA is any user communication device that allows a user to communicate with or sense an AP and further communicate with a WLAN. The apparatus having the wireless communication function may be an entire device, or may be a chip or a processing system installed in an entire device. The device in which the chip or the processing system is installed may implement methods and functions in embodiments of this application under control of the chip or the processing system. For example, the station may be a wireless communication chip, a wireless sensor, or a wireless communication terminal, and may also be referred to as a user. For another example, the station may be a mobile phone, a tablet computer, a set-top box, a smart television, a smart wearable device, a vehicle-mounted communication device, and a computer that support a Wi-Fi communication function.

The WLAN system can provide high-speed and low-latency transmission. With continuous evolution of WLAN application scenarios, the WLAN system is to be applicable to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops, and warehouses. Certainly, a device that supports WLAN communication or sensing (for example, an access point or a station) may be a sensor node in a smart city (for example, a smart water meter, a smart electricity meter, or a smart air detection node), a smart device in smart home (for example, a smart camera, a projector, a display screen, a television, a stereo, a refrigerator, or a washing machine), a node in the internet of things, an entertainment terminal (for example, AR, VR, or another wearable device), a smart device in smart office (for example, a printer, a projector, a loudspeaker, or a stereo), an internet of vehicles device in the internet of vehicles, an infrastructure in daily life scenarios (for example, a vending machine, a self-service navigation station in a supermarket, a self-service cash register device, or a self-service ordering machine), a device in a large sports and music venue, or the like. For example, the access point and the station may be devices used in the internet of vehicles, internet of things nodes in the internet of things (IoT), or sensors, may be smart cameras, smart remote controls, or smart water/electricity meters in smart home, or may be sensors in a smart city. A specific form of the STA and a specific form of the AP are not limited in embodiments of this application, and are merely examples for description herein.

Although this application is mainly described by using an example in which an IEEE 802.11 network is deployed, a person skilled in the art easily understands that various aspects in this application may be extended to other networks using various standards or protocols, for example, a high performance radio LAN (HIPERLAN) (which is a wireless standard similar to the IEEE 802.11 standard, and is mainly used in Europe), a wide area network (WAN), a wireless local area network (WLAN), a personal area network (PAN), or another known network or later developed network.

Figure 3A:
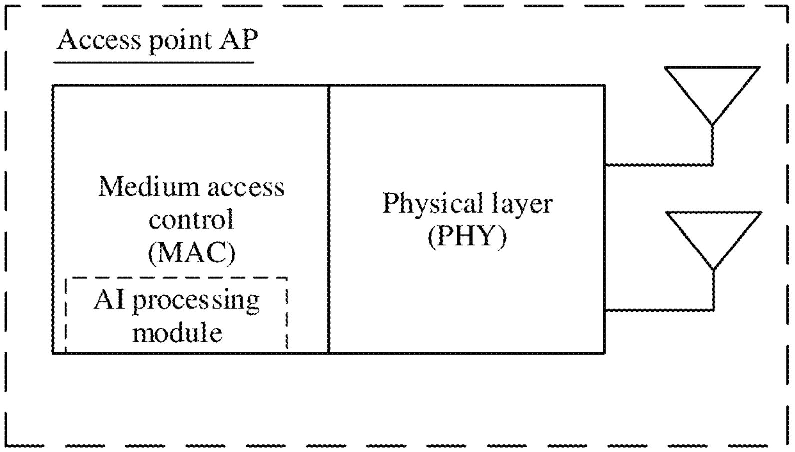
FIG. 3*a* is a diagram of an example structure of an access point according to an embodiment of this application.
Figure 3B:
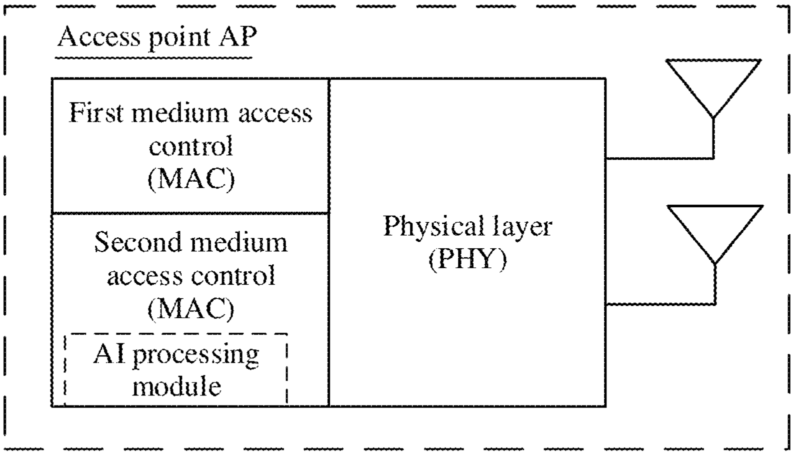
FIG. 3*b* is a diagram of another example structure of an access point according to an embodiment of this application.

For example, the 802.11 standard focuses on PHY and MAC parts. FIG. 3*a* is a diagram of a structure of an access point according to an embodiment of this application. The AP may be a multi-antenna AP or may be a single-antenna AP. As shown in FIG. 3*a*, the AP includes a physical layer (PHY) processing circuit and a medium access control (MAC) processing circuit (which may also be referred to as a processing circuit of a MAC layer). The physical layer processing circuit may be configured to process a physical layer signal, and the MAC layer processing circuit may be configured to process a MAC layer signal. Optionally, the MAC layer processing circuit includes an AI processing module, and the AI processing module may be configured to train a neural network and/or perform inference and decision-making by using a neural network that has been trained, to implement various AI-assisted functions, such as an AI-assisted rate adaptation function, an AI-assisted rate adaptation joint channel access function, and an AI-assisted channel access function. For example, FIG. 3*b* is a diagram of another structure of an access point according to an embodiment of this application. Different from the AP shown in FIG. 3*a*, the AP shown in FIG. 3*b* includes two MAC layers, that is, two MAC layer processing circuits, for example, a first MAC layer processing circuit (which may also be referred to as a processing circuit of a first MAC layer) and a second MAC layer processing circuit (which may also be referred to as a processing circuit of a second MAC layer). Optionally, the first MAC layer processing circuit may be configured to process a first MAC layer signal, and the second MAC layer processing circuit may be configured to process an AI-related signal. For example, the second MAC layer processing circuit includes an AI processing module. It may be understood that the second MAC layer may also be referred to as an AI-MAC layer or the like. A name of the second MAC layer is not limited in this application. The 802.11 standard focuses on PHY and MAC parts.

Figure 3C:
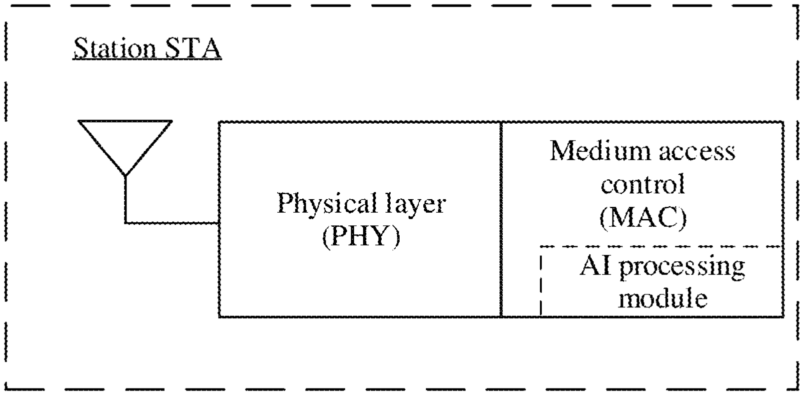
FIG. 3*c* is a diagram of an example structure of a station according to an embodiment of this application.
Figure 3D:
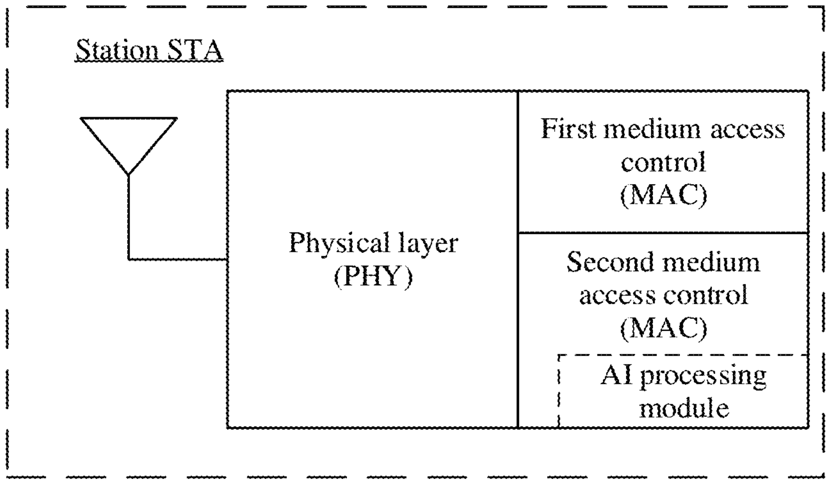
FIG. 3*d* is a diagram of another example structure of a station according to an embodiment of this application.

FIG. 3*c* is a diagram of a structure of a station according to an embodiment of this application. In an actual scenario, the STA may be a single-antenna STA, a multi-antenna STA, or a device with more than two antennas. The STA may include a PHY layer processing circuit and a MAC layer processing circuit, the physical layer processing circuit may be configured to process a physical layer signal, and the MAC layer processing circuit may be configured to process a MAC layer signal. Optionally, the MAC layer processing circuit includes an AI processing module, and the AI processing module may be configured to train a neural network and/or perform inference and decision-making by using a neural network that has been trained, to implement various AI-assisted functions, such as an AI-assisted rate adaptation function, an AI-assisted rate adaptation joint channel access function, and an AI-assisted channel access function. For example, FIG. 3*d* is a diagram of another structure of a station according to an embodiment of this application. Different from the station shown in FIG. 3*c*, the station shown in FIG. 3*d* includes two MAC layer processing circuits, for example, a first MAC layer processing circuit and a second MAC layer processing circuit. Optionally, the first MAC layer processing circuit may be configured to process a first MAC layer signal, and the second MAC layer processing circuit may be configured to process an AI-related signal. For example, the second MAC layer processing circuit includes an AI processing module. It may be understood that the second MAC layer may also be referred to as an AI-MAC layer or the like. A name of the second MAC is not limited in this application.

It may be understood that the AI processing module shown above may also be referred to as an AI processing circuit, a neural network-based processing circuit, a neural network processing circuit, a neural network processor, or the like. A specific name of the AI processing module is not limited in embodiments of this application.

It may be understood that structures of access points shown in FIG. 3*a* and FIG. 3*b* and structures of stations shown in FIG. 3*c* and FIG. 3*d* are merely examples. For example, the access point and the station may further include at least one of a memory, a scheduler, a controller, a processor, or a radio frequency circuit. For specific descriptions of the station and the access point, refer to the following apparatus embodiments.

For example, a communication system to which the method provided in this application is applied may include an access point (AP) and a station (STA), a plurality of access points (APs), or a plurality of stations (STAs). The access point may also be understood as an access point entity, and the station may also be understood as a station entity. For example, this application is applicable to a scenario in which an AP communicates with or senses a STA in a WLAN. Optionally, the AP may communicate with or sense a single STA, or the AP may simultaneously communicate with or sense a plurality of STAs. For another example, this application is applicable to a scenario in which a plurality of APs coordinate in a WLAN. For another example, this application is applicable to a scenario in which a STA performs D2D communication with another STA in a WLAN. Both the AP and the STA may support a WLAN communication protocol, and the communication protocol may include the IEEE802.11 series protocols, for example, may be applicable to the 802.11be standard, or may be applicable to a standard later than 802.11be.

Figure 4:
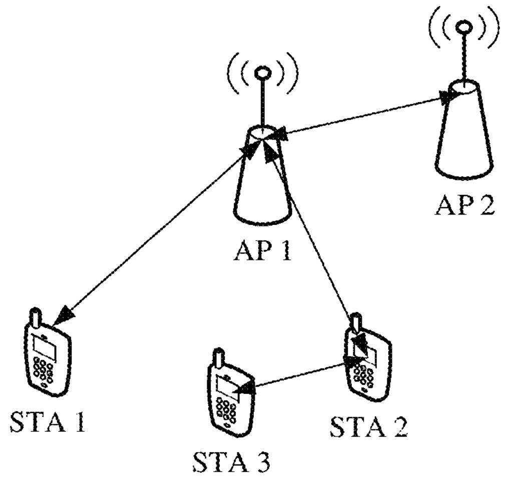
FIG. 4 is a diagram of an example architecture of a communication system according to an embodiment of this application.

FIG. 4 is a diagram of an example architecture of a communication system according to an embodiment of this application. The communication system may include one or more APs and one or more STAs. FIG. 4 shows two access points: an AP 1 and an AP 2, and three stations: a STA 1, a STA 2, and a STA 3. It may be understood that the one or more APs may communicate with the one or more STAs. Certainly, APs may communicate with each other, and STAs may communicate with each other.

It may be understood that, in FIG. 4, an example in which the STAs are mobile phones and the APs are routers is used, and this does not mean that a type of the AP and a type of the STA in this application are limited. In addition, FIG. 4 shows only two APs and three STAs as an example. However, there may be more or fewer APs or STAs. This is not limited in this application.

In communication apparatuses shown below in this application, a first communication apparatus may be a resource-limited node (for example, a node that cannot complete neural network training but can perform inference and decision-making by using a neural network) in a network, for example, a STA in a scenario in which an AP communicates with the STA, an AP with a weak capability (for example, a conventional access point) in a multi-AP coordination scenario, or a STA with a weak capability (for example, a conventional station) in a D2D communication scenario; and correspondingly, a second communication apparatus may be a resource-limitless node or a more powerful node (for example, a node that can complete neural network training and can also perform inference and decision-making by using a neural network) in the network, for example, the AP in the scenario in which the AP communicates with the STA, an AP with a strong capability (for example, an access point supporting the latest 802.11 standard) in the multi-AP coordination scenario, or a STA with a strong capability (for example, a station supporting the latest 802.11 standard) in the D2D communication scenario. The latest 802.11 standard herein may be a future Wi-Fi standard, for example, Wi-Fi 8 (namely, a next-generation standard of 802.11be), Wi-Fi 9 (namely, a next-generation standard of Wi-Fi 8), or Wi-Fi 10 (namely, a next-generation standard of Wi-Fi 9). The conventional access point herein may be an access point that supports only a standard before the latest 802.11 standard, and the conventional station may be a station that supports only a standard before the latest 802.11 standard.

Optionally, the communication apparatus in this application includes a module that can perform inference and decision-making by using a neural network, for example, an AI processing module. For example, an AI processing module in the second communication apparatus may not only perform inference and decision-making by using a neural network, but also perform neural network training; and an AI processing module in the first communication apparatus may perform inference and decision-making by using a neural network that has been trained by the second communication apparatus. Certainly, in some optional embodiments, the AI processing module in the first communication apparatus may alternatively perform neural network training.

It may be understood that the difference between the first communication apparatus and the second communication apparatus includes but is not limited to: capability strength of the communication apparatuses, whether the communication apparatuses have limited resources, or whether the communication apparatuses have a capability of performing neural network training.

This application provides an information exchange method and a related apparatus, so that a resource-limited node (which may refer to the first communication apparatus in this application) in a network can obtain related information of a neural network (for example, a function, a structure, a parameter, an input, and an output of the neural network) that has been trained by a node with a more powerful function (which may refer to the second communication apparatus in this application) in the network. This provides a basis for the resource-limited node to implement AI-assisted rate adaptation or AI-assisted rate adaptation joint channel access. Generally, because neural network training requires a large computing capability and high energy consumption, only some nodes (which are usually nodes with strong capabilities) can complete neural network training and use neural networks trained by the nodes, and other nodes (which are usually resource-limited nodes) cannot complete neural network training or costs (for example, excessively high energy consumption) of performing neural network training are excessively high. As a result, other nodes cannot use an AI-based rate adaptation algorithm to improve performance. However, according to the method provided in embodiments of this application (after the first communication apparatus requests to enable an AI-assisted related function, for example, an AI-assisted rate adaptation function, an AI-assisted channel access function, or an AI-assisted rate adaptation joint channel access function), the second communication apparatus may notify the first communication apparatus of related information of a neural network (for example, information such as a function, a structure, a parameter, an input, and an output of the neural network) that has been trained by the second communication apparatus, so that the first communication apparatus restores, based on the related information, the neural network that has been trained by the second communication apparatus, and performs inference and decision-making based on data observed by the first communication apparatus and the restored neural network, to obtain a corresponding decision result for transmission. In addition, the first communication apparatus does not need to train the neural network. This can not only provide the basis for the resource-limited node to implement AI-assisted rate adaptation or AI-assisted rate adaptation joint channel access, but also reduce energy consumption of the first communication apparatus.

Further, this application further provides an AI-assisted rate adaptation method and a related apparatus. The resource-limited node (namely, the first communication apparatus) in the network uses the neural network that has been trained by the node with the stronger function (namely, the second communication apparatus) in the network, to perform AI-assisted rate adaptation or AI-assisted joint channel access. This improves performance.

The following describes in detail technical solutions provided in this application with reference to more accompanying drawings.

To clearly describe the technical solutions of this application, this application is described by using a plurality of embodiments. For details, refer to the following. In this application, unless otherwise specified, for same or similar parts of embodiments or implementations, refer to each other. In embodiments of this application and implementations/methods/implementation methods in embodiments, unless otherwise specified or there is a logical conflict, terms and/or descriptions are consistent and may be mutually referenced between different embodiments and between the implementations/methods/implementation methods in embodiments. Technical features in different embodiments and the implementations/methods/implementation methods in embodiments may be combined to form a new embodiment, implementation, method, or implementation method based on an internal logical relationship of the technical features. The following implementations of this application are not intended to limit the protection scope of this application.

It should be understood that a sequence of the following embodiments does not represent a degree of importance. Embodiments may be implemented separately, or may be implemented in combination. For details, refer to the following. To facilitate understanding of the technical solutions provided in this application, the AI-assisted rate adaptation method is first described, then the information exchange method for related information of a neural network (information such as a function, a structure, a parameter, an input, and an output of the neural network) is described, and finally the related apparatus or device in this application is described.

Embodiment 1

Embodiment 1 mainly describes an implementation in which a resource-limited node (the following uses a first communication apparatus as an example for description) performs AI-assisted rate adaptation or AI-assisted rate adaptation joint channel access by using a neural network that has been trained by another node (the following uses a second communication apparatus as an example for description) in a network, that is, how the first communication apparatus performs AI-assisted rate adaptation to improve performance.

Figure 5:
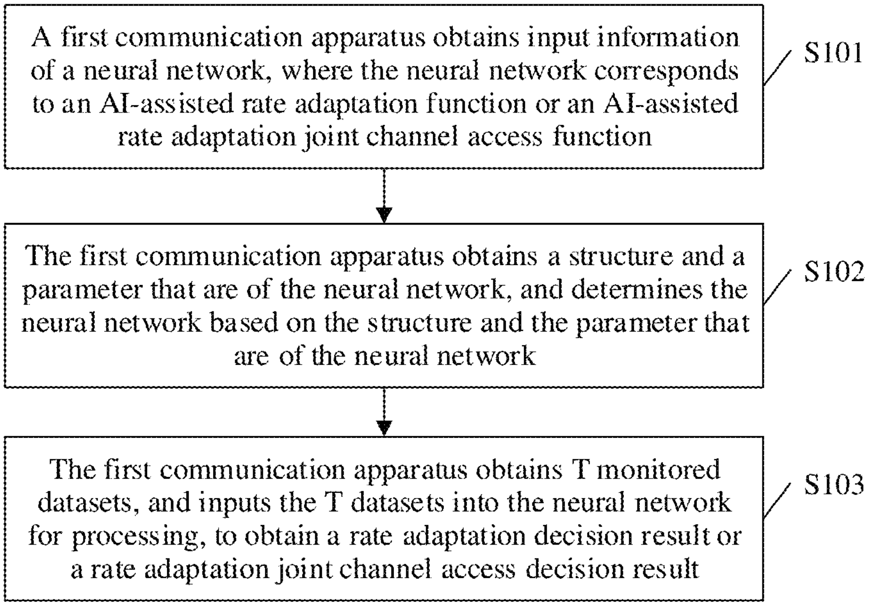
FIG. 5 is a schematic flowchart of an example AI-assisted rate adaptation method according to an embodiment of this application.

FIG. 5 is a schematic flowchart of an example AI-assisted rate adaptation method according to an embodiment of this application. As shown in FIG. 5, the AI-assisted rate adaptation method includes but is not limited to the following steps.

S101: The first communication apparatus obtains input information of a neural network, where the neural network corresponds to an AI-assisted rate adaptation function or an AI-assisted rate adaptation joint channel access function.

The neural network in this application corresponds to an AI-assisted related function. In other words, the neural network in this application is configured to implement or support the AI-assisted related function. It may be understood that the neural network in this application may be trained by another communication apparatus (which is a communication apparatus other than the first communication apparatus in the network, for example, the second communication apparatus), so that the neural network can implement or support the AI-assisted related function. The AI-assisted related function includes one or more of the following: the AI-assisted rate adaptation function and the AI-assisted rate adaptation joint channel access function. Optionally, the AI-assisted related function may further include one or more of the following: an AI-assisted channel access function, an AI-assisted channel aggregation function, or an AI-assisted channel aggregation joint channel access function. That is, there may be a one-to-many relationship between the neural network in this application and the AI-assisted related function. To be specific, one neural network implements/supports a plurality of AI-assisted functions, that is, a plurality of different AI-assisted functions correspond to a same neural network. Alternatively, there may be a one-to-one relationship between the neural network in this application and the AI-assisted related function. To be specific, one neural network implements/supports one AI-assisted function, that is, different AI-assisted functions correspond to different neural networks.

Different AI-assisted functions correspond to different input information of the neural network, that is, the functions correspond to the input information. The following uses an example for description.

Example 1: When the neural network is used to implement or support the AI-assisted rate adaptation function (or when the neural network corresponds to the AI-assisted rate adaptation function), the input information of the neural network includes but is not limited to one or more of the following: a carrier sense result, received power, an MCS used for a data packet, a number of multiple input multiple output (MIMO) data streams, a channel bandwidth, a queuing delay, an access delay, a data packet transmission result, or channel information. Correspondingly, a decision result of the neural network includes but is not limited to one or more of the following: an MCS to be used for transmission, a number of MIMO data streams to be used for transmission, or a channel bandwidth to be used for transmission.

Example 2: When the neural network is used to implement or support the AI-assisted rate adaptation joint channel access function (or when the neural network corresponds to the AI-assisted rate adaptation joint channel access function), the input information of the neural network includes but is not limited to one or more of the following: a carrier sense result, received power, an MCS used for a data packet, a number of MIMO data streams, a channel bandwidth, a queuing delay, an access delay, channel access behavior, a data packet transmission result, or channel information. Correspondingly, a decision result of the neural network includes but is not limited to one or more of the following: non-access, an MCS to be used for access, a number of MIMO data streams to be used for transmission, or a channel bandwidth to be used for transmission.

Example 3: When the neural network is used to implement or support the AI-assisted channel access function (or when the neural network corresponds to the AI-assisted channel access function), the input information of the neural network includes but is not limited to one or more of the following: a carrier sense result, a queuing delay, an access delay, channel access behavior, and a data packet transmission result. Correspondingly, a decision result of the neural network includes whether to access.

Optionally, the input information of the neural network in Example 1, Example 2, and Example 3 may further include but is not limited to one or more of the following: a packet loss rate, a throughput, or a duration from a current moment to time of previous successful transmission of the communication apparatus.

The carrier sense result may be busy or idle of a channel, or may be a received signal strength indicator (RSSI). The queuing delay may be a time interval from time at which a data packet enters a sending queue to time at which the data packet is sent. The access delay may be a time interval from time at which a data packet is sent to time at which the data packet is successfully sent. The channel access behavior may refer to two types of behavior: access and non-access. The data packet transmission result includes a transmission success and a transmission failure. The channel information may be channel state information (CSI), or may be a signal to noise ratio (SNR).

In an implementation, when the first communication apparatus finds that performance of the first communication apparatus in a communication process is poor, for example, the first communication apparatus finds that a packet loss rate of the first communication apparatus is greater than a preset threshold, the first communication apparatus may determine to enable the AI-assisted rate adaptation function or the AI-assisted rate adaptation joint channel access function, and then obtain the input information of the neural network. The neural network corresponds to a to-be-enabled function. A specific AI-assisted function to be enabled may be determined by the first communication apparatus based on a strategy of the first communication apparatus. This is not limited in this embodiment.

In another implementation, the first communication apparatus sends function request information, to request to enable the AI-assisted rate adaptation function or the AI-assisted rate adaptation joint channel access function; and after receiving the function request information, the second communication apparatus may reply with function response information to respond to a request of the function request information. For a specific implementation, refer to descriptions in Embodiment 2 below. If the function response information indicates that the request of the function request information is agreed, after receiving the function response information, the first communication apparatus may obtain the input information of the neural network. The neural network corresponds to the function that is requested to be enabled by the function request information.

There are at least two implementations in which the first communication apparatus obtains the input information of the neural network. In a first implementation, the first communication apparatus locally obtains the input information of the neural network. For example, a correspondence between the AI-assisted functions (that is, functions implemented or supported by the neural network) and the input information of the neural network may be predefined, that is, the correspondence indicates input information respectively corresponding to one or more AI-assisted functions. For details, refer to descriptions in Example 1 to Example 3. In a second implementation, the first communication apparatus receives the input information of the neural network from the second communication apparatus. Specifically, for an implementation in which the second communication apparatus exchanges the input information of the neural network with the first communication apparatus, refer to descriptions in Embodiment 3 below.

"Predefine" and "preset" in this application may be understood as "define", "predefine", "store", "pre-store", "pre-negotiate", "pre-configure", "solidify", "pre-burn", or the like.

S102: The first communication apparatus obtains a structure and a parameter that are of the neural network, and determines the neural network based on the structure and the parameter that are of the neural network.

The structure of the neural network in this application includes an input layer structure, an output layer structure, and a hidden layer structure. In this case, that the first communication apparatus obtains the structure of the neural network may be understood as follows: The first communication apparatus separately obtains the input layer structure, the output layer structure, and the hidden layer structure that are of the neural network.

Optionally, the input layer structure of the neural network includes a number of neurons at an input layer. The number of neurons at the input layer (that is, the input layer structure) may be determined based on a number of neurons corresponding to each type of input information and a number of pieces of/a length of input information of the neural network. For example, the number of neurons at the input layer=a sum of numbers of neurons corresponding to all input information obtained in step S101*a number of pieces of input information of the neural network. The number of neurons corresponding to each type of input information may be preset or defined in a standard protocol, or may be indicated by the second communication apparatus. For details about an indication manner, refer to related descriptions in Embodiment 3 below. The number of pieces of/the length of input information of the neural network may be preset or defined in a standard protocol, or may be indicated by the second communication apparatus. For details about an indication manner, refer to related descriptions in Embodiment 3 below.

Optionally, the output layer structure of the neural network includes one or more of the following: a number of neurons at an output layer or an activation function used by a neuron at the output layer. In some scenarios, the output layer structure of the neural network may be determined based on an AI-assisted function (that is, a function requested or to be enabled in step S101). In other words, output layer structures of the neural network one-to-one correspond to the AI-assisted functions. When an AI-assisted function implemented or supported by the neural network is determined, an output layer structure of the neural network is also determined. For example, a correspondence between the AI-assisted function (that is, the function implemented or supported by the neural network) and the output layer structure of the neural network may be predefined. In some other scenarios, the output layer structure of the neural network may be indicated by the second communication apparatus. For details, refer to descriptions in Embodiment 4 below.

Optionally, the hidden layer structure of the neural network includes one or more of the following: a number of hidden layers, a number of neurons at each layer, an activation function used by a neuron at each layer, or a connection manner between neurons at each layer. The hidden layer structure may be a preset structure or a structure defined in a standard protocol, or may be indicated by the second communication apparatus. For details about an indication manner, refer to related descriptions in Embodiment 2 below.

The parameter of the neural network in this application includes one or more of the following: a bias or a weight of a neuron. A manner of obtaining the parameter of the neural network may be as follows: The first communication apparatus receives the parameter of the neural network from the second communication apparatus. Specifically, for an implementation in which the second communication apparatus exchanges the parameter of the neural network with the first communication apparatus, refer to descriptions in any one of Embodiment 2 to Embodiment 4 below.

It may be understood that all information about the neural network is known after the structure and the parameter of the neural network are known. Therefore, the first communication apparatus may determine the neural network based on the structure and the parameter that are of the neural network.

S103: The first communication apparatus obtains T monitored datasets, and inputs the T datasets into the neural network for processing, to obtain a rate adaptation decision result or a rate adaptation joint channel access decision result.

Optionally, the first communication apparatus obtains the T datasets monitored by the first communication apparatus within a predetermined duration, one dataset includes one or more pieces of data, and one piece of data corresponds to one type of input information obtained in step S101. Different data in one dataset corresponds to different input information. A value of T may be predefined, or may be specified in a standard protocol, or may be indicated by the second communication apparatus, and is specifically indicated by second indication information in Embodiment 3 below. For an indication manner, refer to descriptions in Embodiment 3 below. Then, the first communication apparatus may input the T datasets into the neural network generated in step S102 for processing, to obtain an output result of the neural network, and select a result from the output result as a decision result. Specific content of the decision result corresponds to an AI-assisted function. For details, refer to descriptions in Example 1 to Example 3.

For example, a main factor that affects a rate is an MCS. It is determined that an input of the neural network is T historical datasets, each dataset includes two pieces of data, one piece of data is a carrier sense result RSSI, and the other piece of data is received power P. In this case, one dataset may be represented as ($RSSI_t$, $P_t$). A value of t is a positive integer less than or equal to T (that is, 1, 2, 3, 4, . . . , and T). It is assumed that the carrier sense result (RSSI) and the received power (P) separately correspond to one neuron, the input layer of the neural network includes 2T neurons. Outputs of the neural network are expected rewards of N MCSs (that is, $MCS_0$ to $MCS_{N-1}$). Because one neuron at the output layer can output an expected reward of only one MCS, the output layer includes N neurons. For example, the expected reward herein may be an expected throughput, an expected delay, or the like. It is assumed that an activation function of a neuron at the output layer is a linear function, and a manner of selecting a decision result is to select an MCS corresponding to a maximum value of the output layer. The hidden layer structure of the neural network is a 32*8 residual fully-connected network, that is, a hidden layer includes eight layers of fully-connected networks in total, three skip connections, and 32 neurons at each layer, and an activation function of each neuron is a rectified linear unit (ReLU).

Figure 6:
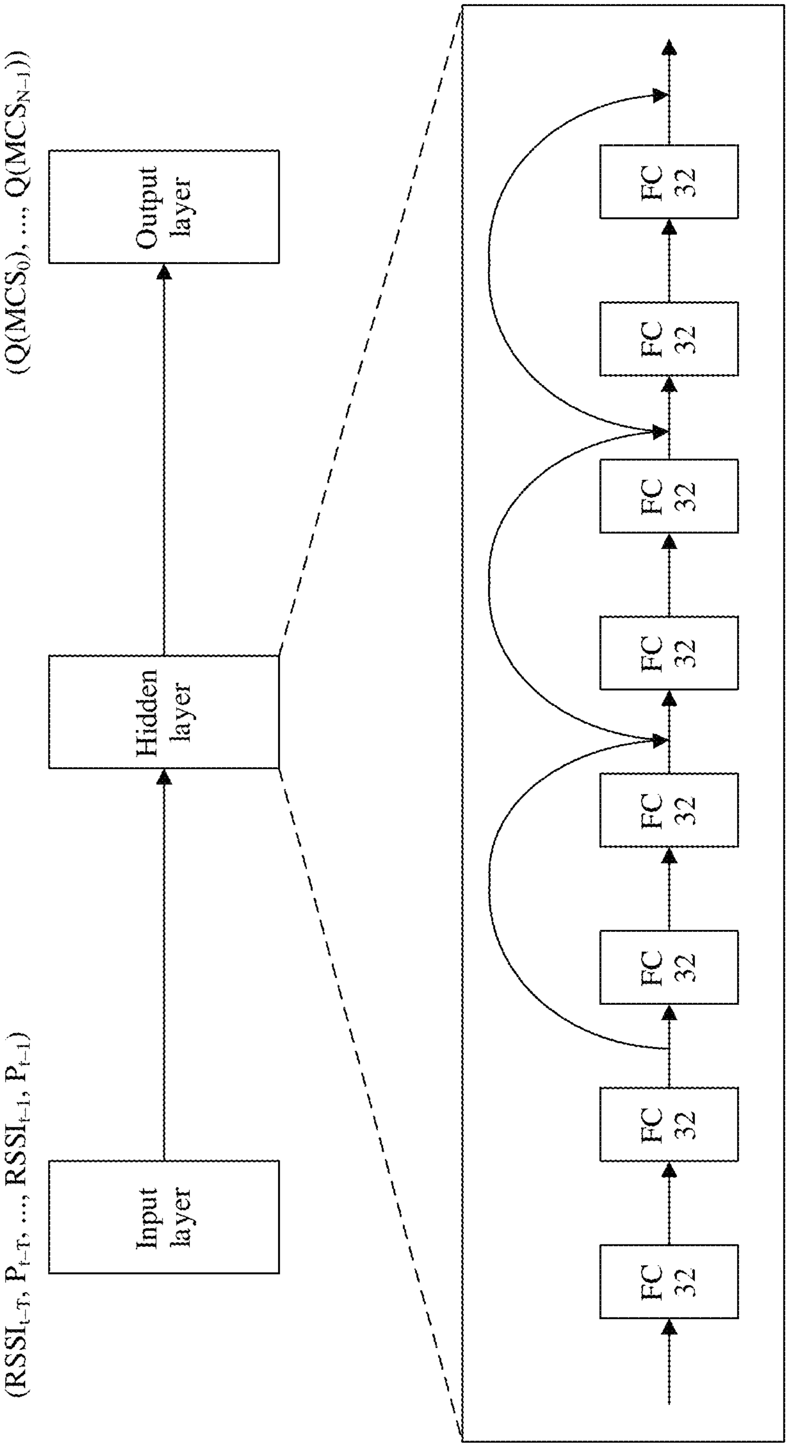
FIG. 6 is a diagram of an example neural network model and example inputs and outputs that are of the neural network model according to an embodiment of this application.

After the foregoing information is determined, a neural network model is uniquely determined. FIG. 6 is a diagram of a neural network model and inputs and outputs that are of the neural network model according to an embodiment of this application. After the first communication apparatus receives the parameter of the neural network delivered by the second communication apparatus, the first communication apparatus may perform, by using the neural network, inference on the T historical datasets monitored by the first communication apparatus, and select the MCS corresponding to the maximum value of the output layer for transmission.

Optionally, the manner of selecting the foregoing decision result may be determined by the first communication apparatus, or may be indicated by the second communication apparatus. For a specific indication manner, refer to descriptions in Embodiment 4 below.

The first communication apparatus in this embodiment performs inference and decision-making by using the neural network that has been trained by another communication apparatus (for example, the second communication apparatus), to implement AI-assisted rate adaptation or AI-assisted rate adaptation joint channel access, so as to improve performance of the first communication apparatus. In addition, the first communication apparatus does not need to train the neural network. This reduces energy consumption of the first communication apparatus.

In addition, most commercial Wi-Fi rate adaptation algorithms are sampling-based, including a Minstrel algorithm and an Iwl-mvm-rs algorithm. A basic principle of the algorithms is to sample MCSs, collect statistics on a characteristic quantity of each MCS, such as a throughput and a packet loss rate, and finally determine an MCS based on collected characteristic quantities. However, this method has at least the following disadvantages: (1) Because a sampling period is long (if a sampling period is excessively short, a channel condition cannot be reflected), obtained statistical values cannot reflect a current radio environment (because the radio environment changes with time), resulting in poor transmission performance; and (2) after the radio environment changes, a proper MCS can be obtained through adjustment only after re-sampling is performed for a long time, resulting in poor adaptability.

However, in this embodiment, the MCS does not need to be determined through long-term sampling, but rate adaptation MCS selection is performed by using a prediction capability of the neural network. Therefore, this embodiment has high adaptability, low complexity, and good scalability, and can implement multi-vendor interoperability.

Embodiment 2

Embodiment 2 mainly describes an implementation of a function request, that is, how a first communication apparatus requests to enable an AI-assisted related function.

Optionally, Embodiment 2 may be implemented in combination with Embodiment 1, or may be implemented separately. This is not limited in this application.

Figures 7, 8:
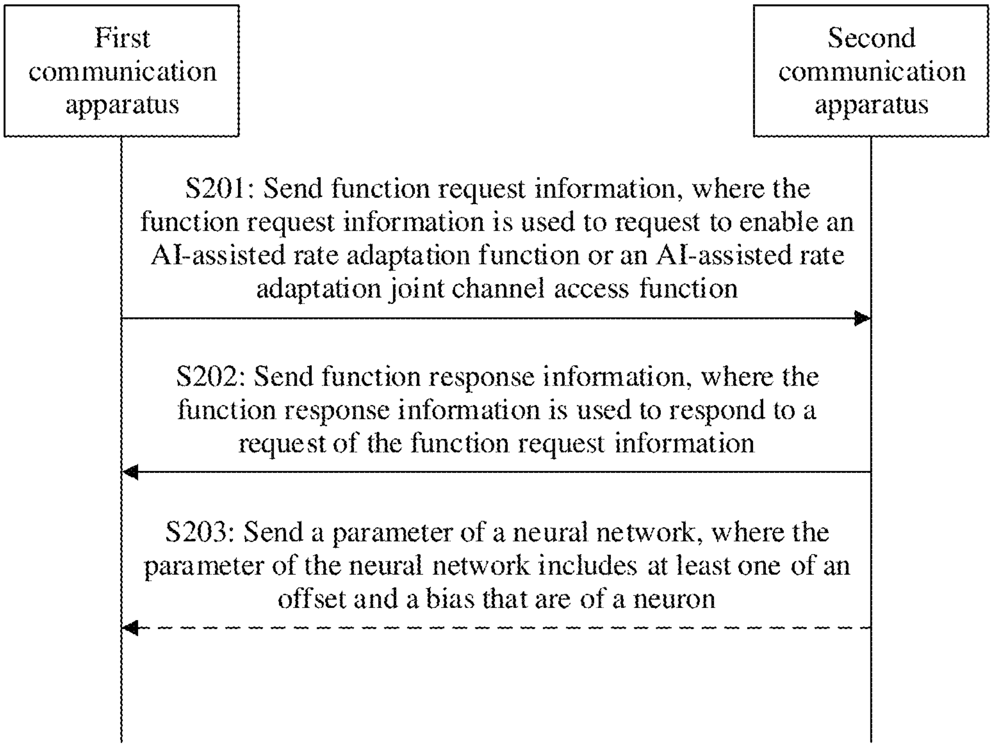
FIG. 7 is a schematic flowchart of an example information exchange method according to an embodiment of this application.
FIG. 8 is a diagram of an example frame format of an information element according to an embodiment of this application.

FIG. 7 is a schematic flowchart of an example information exchange method according to an embodiment of this application. As shown in FIG. 7, the information exchange method includes but is not limited to the following steps.

S201: The first communication apparatus sends function request information, where the function request information is used to request to enable an AI-assisted rate adaptation function or an AI-assisted rate adaptation joint channel access function.

Correspondingly, a second communication apparatus receives the function request information.

Optionally, when the first communication apparatus finds that performance of the first communication apparatus in a communication process is poor, for example, a packet loss rate is greater than a preset threshold, a throughput is lower than a corresponding threshold, a rate change exceeds a corresponding threshold, or a number of consecutive transmission failures exceeds a threshold, the first communication apparatus may send the function request information to the second communication apparatus. Alternatively, when the first communication apparatus wants to transmit data of a service (the service is a delay-sensitive service), the first communication apparatus may send the function request information to the second communication apparatus. A trigger condition for sending the function request information by the first communication apparatus is not limited in this embodiment. The function request information may be used to request (or indicate) to enable the AI-assisted rate adaptation function or the AI-assisted rate adaptation joint channel access function. Optionally, the function request information may be further used to request (or indicate) to enable another AI-assisted function, for example, an AI-assisted channel access function, an AI-assisted channel aggregation function, or an AI-assisted channel aggregation joint channel access function.

Optionally, the function request information may exist in a form of a field, or may exist in a form of a bitmap. This is not limited in this embodiment. In an example, the function request information exists in a form of a field. For ease of description, the field is referred to as an AI function request field. In other words, the AI function request field mentioned below represents the function request information. Certainly, the field may also have another name. This is not limited in this embodiment. When the AI function request field is set to a first value, the AI-assisted rate adaptation function is requested (or indicated) to be enabled; when the AI function request field is set to a second value, the AI-assisted rate adaptation joint channel access function is requested (or indicated) to be enabled; when the AI function request field is set to another value (which is a value other than the first value and the second value), it indicates a reserved field; or when the AI function request field is set to another value, another AI-assisted function is requested (or indicated) to be enabled. For example, when the AI function request field is set to a third value, the AI-assisted channel access function is requested (or indicated) to be enabled; when the AI function request field is set to a fourth value, the AI-assisted channel aggregation function is requested (or indicated) to be enabled; or when the AI function request field is set to a fifth value, the AI-assisted channel aggregation joint channel access function is requested (or indicated) to be enabled. The first value, the second value, the third value, the fourth value, and the fifth value are different from each other, and are all natural numbers.

For example, it is assumed that the length of the AI function request field is 2 bits, and the first value and the second value are any two of decimal 0, 1, 2, and 3. For example, the first value is 0, and the second value is 1. In this case, when the AI function request field is set to 0, the AI-assisted rate adaptation function is requested to be enabled; when the AI function request field is set to 1, the AI-assisted rate adaptation joint channel access function is requested to be enabled; or when the AI function request field is set to 2 or 3, it indicates a reserved field. Alternatively, when the AI function request field is set to 2, the AI-assisted channel access function is requested to be enabled, or when the AI function request field is set to 3, it indicates a reserved field. Alternatively, when the AI function request field is set to 2, the AI-assisted channel access function is requested to be enabled, or when the AI function request field is set to 3, the AI-assisted channel aggregation function is requested to be enabled.

For another example, it is assumed that the length of the AI function request field is 3 bits, and the first value and the second value are any two of decimal 0, 1, 2, 3, 4, 5, 6, and 7. For example, the first value is 0, and the second value is 1. In this case, when the AI function request field is set to 2 to 7 (that is, 2, 3, 4, 5, 6, and 7), it indicates a reserved field; or when the AI function request field is set to 2, the AI-assisted channel access function is requested to be enabled, and when the AI function request field is set to 3 to 7 (that is, 3, 4, 5, 6, and 7), it indicates a reserved field; or when the AI function request field is set to 3, the AI-assisted channel aggregation function is requested to be enabled, and when the AI function request field is set to 4 to 7 (that is, 4, 5, 6, and 7), it indicates a reserved field; or when the AI function request field is set to 4, the AI-assisted channel aggregation joint channel access function is requested to be enabled, and when the AI function request field is set to 5 to 7 (that is, 3, 5, 6, and 7), it indicates a reserved field.

It should be understood that the foregoing lengths of the AI function request field are merely examples. In actual implementation, the length of the AI function request field may be shorter or longer. The length of the AI function request field is not limited in this embodiment. For example, the length of the AI function request field is 1 bit. In this case, when the bit is set to 0, the AI-assisted rate adaptation function is requested to be enabled, or when the bit is set to 1, the AI-assisted rate adaptation joint channel access function is requested to be enabled. For another example, the length of the AI function request field is 4 bits, the first value to the fifth value are any five integers of decimal 0 to 15 (that is, 0, 1, 2, 3, . . . , 14, and 15), and other values indicate a reserved field.

In another example, the function request information exists in a form of a bitmap. For ease of description, the bitmap is referred to as an AI function request bitmap. In other words, the AI function request bitmap mentioned below represents the function request information. Certainly, the bitmap may also have another name. This is not limited in this embodiment. One bit in the AI function request bitmap corresponds to one function. When a bit in the AI function request bitmap is set to 1, a function corresponding to the bit is requested (or indicated) to be enabled. Certainly, when a bit in the AI function request bitmap is set to 0, a function corresponding to the bit may be requested (or indicated) to be enabled.

For example, it is assumed that a length of the AI function request bitmap is 2 bits. In this case, when the AI function request bitmap is 01 (binary), the AI-assisted rate adaptation function is requested to be enabled; when the AI function request bitmap is 10 (binary), the AI-assisted rate adaptation joint channel access function is requested to be enabled; or when the AI function request bitmap is 00 or 11 (binary), it indicates a reserved field, or it indicates that neither the AI-assisted rate adaptation function nor the AI-assisted rate adaptation joint channel access function is enabled. Certainly, when the AI function request bitmap is 10 (binary), the AI-assisted rate adaptation function may be requested to be enabled; or when the AI function request bitmap is 01 (binary), the AI-assisted rate adaptation joint channel access function may be requested to be enabled. This is not limited in this embodiment. It may be understood that the foregoing indication manner is merely an example, and there may be other indication manners. For example, when the AI function request bitmap is 01 (binary), the AI-assisted rate adaptation function is requested to be enabled; when the AI function request bitmap is 10 (binary), the AI-assisted channel access function is requested to be enabled; when the AI function request bitmap is 11 (binary), the AI-assisted rate adaptation joint channel access function is requested to be enabled; or when the AI function request bitmap is 00 (binary), it indicates a reserved field, or it indicates that neither the AI-assisted rate adaptation function nor the AI-assisted rate adaptation joint channel access function is enabled.

It should be understood that the foregoing length of the AI function request bitmap is merely an example. In actual implementation, the length of the AI function request bitmap may be longer. The length of the AI function request bitmap is not limited in this embodiment. For example, the length of the AI function request bitmap is 3 bits, 4 bits, 8 bits, 16 bits, or the like.

In a possible implementation, the function request information may be carried in a new information element (IE). In other words, in this embodiment, a new information element may be defined to carry the function request information. For example, FIG. 8 is a diagram of a frame format of an information element according to an embodiment of this application. As shown in FIG. 8, the information element includes but is not limited to an element identifier (element ID) field, a length field, an element identifier extension (element ID extension) field, and an AI function request bitmap (or an AI function request field). For a value and a meaning that are of the AI function request bitmap (or the AI function request field), refer to the foregoing descriptions. Details are not described herein again.

It should be understood that the information element shown in FIG. 8 is merely an example. In actual application, the information element may include more or fewer fields or subfields.

Figure 9:
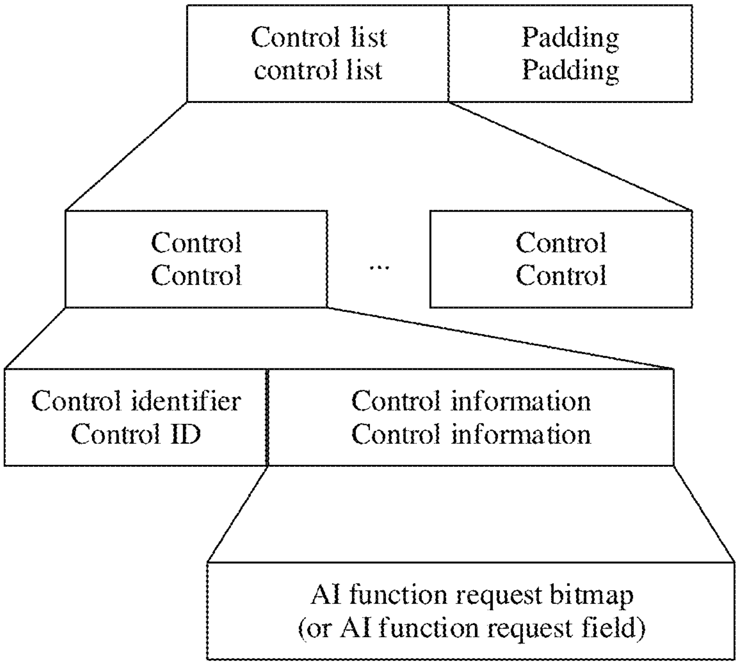
FIG. 9 is a diagram of an example frame format of an A-control subfield according to an embodiment of this application.

In another possible implementation, the function request information may be carried in an aggregated control (A-control) subfield in a high throughput (HT) control field. FIG. 9 is a diagram of a frame format of an A-control subfield according to an embodiment of this application. As shown in FIG. 9, the A-control subfield includes but is not limited to an AI function request bitmap (or an AI function request field). The AI function request bitmap (or the AI function request field) is located in control information of a control subfield, and the control subfield further includes a control identifier (control ID). For a value and a meaning that are of the AI function request bitmap (or the AI function request field), refer to the foregoing descriptions. Details are not described herein again.

It should be understood that the A-control subfield shown in FIG. 9 is merely an example. In actual application, the A-control subfield may include more or fewer subfields.

Optionally, the function request information may be carried in a function request frame. For example, the information element (for example, the frame format shown in FIG. 8) or the A-control subfield (for example, the frame format shown in FIG. 9) that carries the function request information is located in the function request frame. The function request frame may be a newly defined frame, or may be a frame that reuses a previous standard, for example, a beacon frame or an action frame. When the function request frame is the frame that reuses the previous standard, the function request frame may further include one piece of indication information used to distinguish whether the function request frame maintains an original function or implements a function (which is referred to as a new function or an extended function) in this embodiment. In addition, if the function request frame is the frame that reuses the previous standard, the function request information may not only be carried in the newly defined information element or the A-control subfield in the function request frame, but also may be carried in a reserved field in the function request frame (if the function request frame has the reserved field).

S202: The second communication apparatus sends function response information, where the function response information is used to respond to a request of the function request information.

Correspondingly, the first communication apparatus receives the function response information.

Optionally, after the second communication apparatus receives the function request information, the second communication apparatus may send the function response information to the first communication apparatus, to respond to (that is, agree to or reject) the request of the function request information. The function response information may exist in a form of a field. For example, a length of the function response information is 1 bit. In this case, when the bit is set to 1, it indicates that the request of the function request information is agreed; or when the bit is set to 0, it indicates that the request of the function request information is rejected. Alternatively, when the bit is set to 0, it indicates that the request of the function request information is agreed; or when the bit is set to 1, it indicates that the request of the function request information is rejected. In this embodiment, whether the function response information being set to 1 or 0 indicates that the request of the function request information is agreed is not limited.

Optionally, the function response information may be carried in the information element, the A-control subfield, or the reserved field in the function response frame. The function response frame may be a newly defined frame, or may be a frame that reuses a previous standard, for example, an action frame. When the function response frame is the frame that reuses the previous standard, the function response frame may further include one piece of indication information used to distinguish whether the function response frame is used to respond to an original function or respond to a function (that is, an extended function) in this embodiment.

Optionally, when the second communication apparatus agrees to the request of the function request information, the second communication apparatus may send a parameter of a neural network to the first communication apparatus. In a possible implementation, the second communication apparatus may include the parameter of the neural network in the function response information. It may be understood that if the function response information carries the parameter (which may be all parameters or a part of parameters herein) of the neural network, it may indicate that the second communication apparatus agrees to the request of the function request information. In this case, there is no need to use another field or bit (in the function response information) to indicate that the request of the function request information is agreed. Certainly, even if the function response information carries the parameter (which may be all parameters or a part of parameters herein) of the neural network, another field or bit may be used in the function response information to indicate that the request of the function request information is agreed. This is not limited in this embodiment.

In another possible implementation, the second communication apparatus may separately send the parameter of the neural network. To be specific, when the function response information indicates that the request of the function request information is agreed, the method shown in FIG. 7 may further include step S203.

S203: The second communication apparatus sends the parameter of the neural network, where the parameter of the neural network includes at least one of a bias and a weight that are of a neuron.

In this embodiment, the parameter that is of the neural network and that is separately sent has a clear meaning and is not easily confused.

In still another possible implementation, the foregoing two possible implementations may be used in combination. To be specific, a part of parameters of the neural network, for example, the weight of the neuron, may be carried in the function response information, and the other part of the parameters of the neural network, for example, the bias of the neuron, is separately sent.

The neural network in this embodiment corresponds to a function requested by the function request information. In other words, the neural network is configured to implement or support the function requested by the function request information.

Optionally, when the function response information indicates that the request of the function request information is agreed or the second communication apparatus agrees to the request of the function request information, the function response information may further include one piece of indication information (which is denoted as fourth indication information for ease of distinguishing between different indication information in this specification), where the fourth indication information may indicate a hidden layer structure of the neural network.

Alternatively, the second communication apparatus may separately send the hidden layer structure of the neural network to the first communication apparatus. In other words, after step S202, if the function response information indicates that the request of the function request information is agreed, the second communication apparatus may further send the fourth indication information to the first communication apparatus, to indicate the hidden layer structure of the neural network.

In an example, the hidden layer structure of the neural network is one of a plurality of predefined hidden layer structures. Each hidden layer structure may be represented by one or more of the following information: a number of hidden layers, a number of neurons at each layer, an activation function used by a neuron at each layer, and a connection manner between neurons at each layer. The plurality of predefined hidden layer structures may be specified in a standard protocol, or may be notified by the second communication apparatus to the first communication apparatus in advance, for example, the first communication apparatus and the second communication apparatus exchange the plurality of predefined hidden layer structures in a process of establishing a connection (if the first communication apparatus and the second communication apparatus are respectively a STA and an AP, the process of establishing the connection may be an association process). The fourth indication information may specifically indicate which one of the plurality of predefined hidden layer structures is the hidden layer structure of the neural network. For example, three hidden layer structures are predefined, and are respectively identified by using a mode 1, a mode 2, and a mode 3. If the fourth indication information indicates the mode 2, it indicates that the hidden layer structure of the neural network is a hidden layer structure identified by using the mode 2 (that is, one or more of a number of hidden layers, a number of neurons at each layer, an activation function used by a neuron at each layer, and a connection manner between neurons at each layer).

It may be understood that, in this embodiment, the plurality of hidden layer structures are predefined, and indication information indicates a hidden layer structure that is used and that is in the plurality of predefined hidden layer structures. This reduces a number of bits, and reduces overheads.

In another example, the hidden layer structure of the neural network includes one or more of the following: a number of hidden layers, a number of neurons at each layer, an activation function used by a neuron at each layer, or a connection manner between neurons at each layer. Therefore, the fourth indication information may indicate one or more of the number of hidden layers, the number of neurons at each layer, the activation function used by the neuron at each layer, or the connection manner between the neurons at each layer.

It may be understood that, in this embodiment, information included in the hidden layer structure is indicated, so that the hidden layer structure of the neural network can be more flexibly designed, and is not limited to the plurality of predefined hidden layer structures.

Alternatively, a part of the hidden layer structure of the neural network, for example, the number of hidden layers and the number of neurons at each layer, may be carried in the function response information; and the other part of the hidden layer structure of the neural network, for example, the activation function used by the neuron at each layer and the connection manner between the neurons at each layer, is separately sent.

Optionally, after the first communication apparatus receives the function response information, if the function response information indicates that the request of the function request information is agreed, the first communication apparatus may enable the function that is requested to be enabled by the function request information, and perform the AI-assisted rate adaptation method shown in Embodiment 1.

Optionally, when the second communication apparatus does not agree to the request of the function request information, that is, the function response information indicates that the request of the function request information is rejected, after the first communication apparatus receives the function response information, the first communication apparatus may perform communication by using a conventional rate adaptation algorithm and conventional channel access. The conventional rate adaptation algorithm includes but is not limited to a sampling-based Minstrel or Iwl-mvm-rs algorithm. A basic principle of the Minstrel or Iwl-mvm-rs algorithm is to sample MCSs, collect statistics on a characteristic quantity on each MCS, for example, a throughput and a packet loss rate, and finally determine an MCS based on collected characteristic quantities. For specific implementations of the algorithms, refer to the conventional technology. The conventional channel access includes but is not limited to carrier sense multiple access with collision avoidance (CSMA/CA).

The first communication apparatus in this embodiment sends the function request information to the second communication apparatus, to request to enable an AI-assisted related function, and the second communication apparatus replies with the corresponding function response information, so that the first communication apparatus determines, based on the function response information, whether to enable the AI-assisted related function. This can provide a basis for the first communication apparatus to implement AI-assisted rate adaptation or AI-assisted rate adaptation joint channel access.

In an optional embodiment, the second communication apparatus may alternatively initiate a function request. Specifically, the second communication apparatus sends function request information, where the function request information is used to request or notify enabling of any one of the following functions: an AI-assisted rate adaptation function, an AI-assisted rate adaptation joint channel access function, an AI-assisted channel access function, an AI-assisted channel aggregation function, and an AI-assisted channel aggregation joint channel access function. After receiving the function request information, the first communication apparatus may reply with response information. The response information may indicate that a request of the function request information is agreed or rejected, or the response information may be used to acknowledge that the function request information is received. For example, the response information is an acknowledgment (acknowledge, ACK) frame or a block acknowledgment (block ACK, BA).

Optionally, the function request information may further carry a parameter of a neural network.

Optionally, the function request information may further include fourth indication information that indicates a hidden layer structure of the neural network.

Optionally, the function request information may be carried in a broadcast frame, for example, a beacon (beacon) frame. Certainly, the function request information may alternatively be carried in a unicast frame.

In this embodiment, a node with a strong capability (for example, an AP or the second communication apparatus) may send the function request information, to request or indicate one or more resource-limited nodes (for example, a STA or the first communication apparatus) to enable an AI-assisted related function. This can not only provides a basis for the resource-limited node to implement AI-assisted rate adaptation or AI-assisted rate adaptation joint channel access, but also enable AI-assisted related functions of a plurality of resource-limited nodes through one interaction, thereby saving air interface resources.

Embodiment 3

Embodiment 3 mainly describes a frame format indicated by input information, that is, how a first communication apparatus and a second communication apparatus reach an agreement on the input information of a neural network.

Optionally, Embodiment 3 may be implemented in combination with one or more of Embodiment 1 and Embodiment 2, or may be implemented separately. This is not limited in this application.

Figure 10:
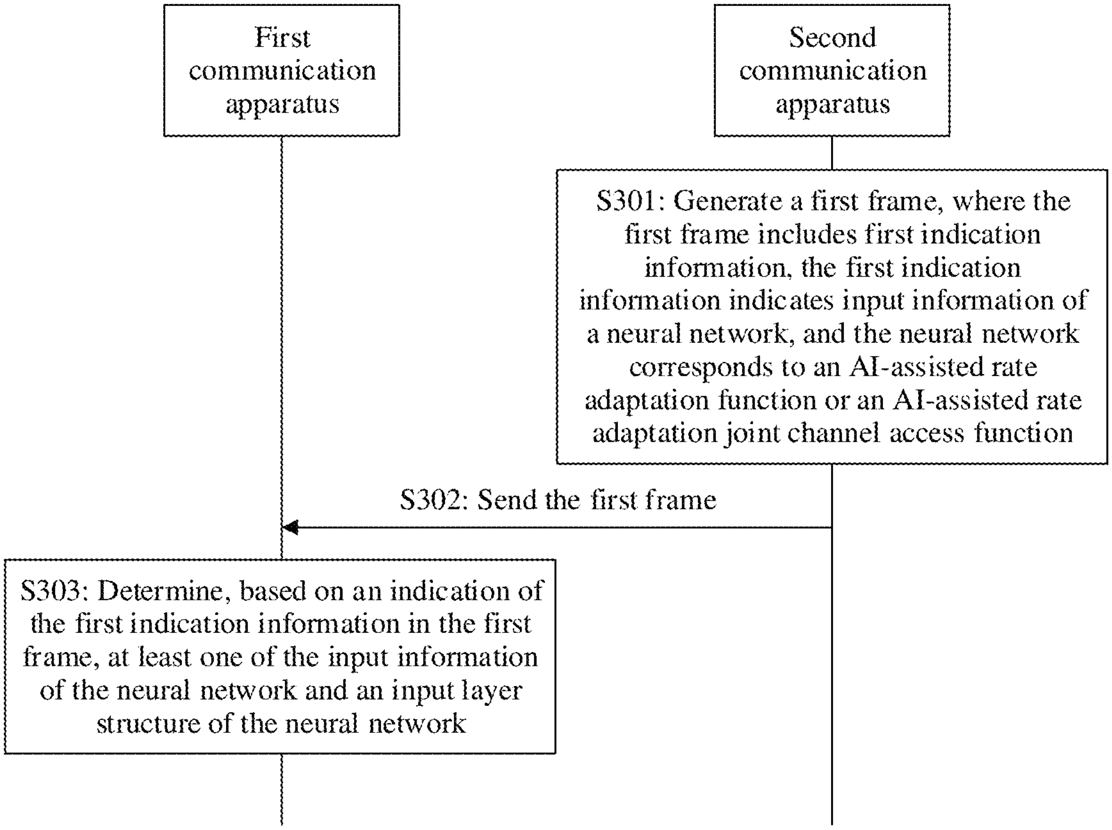
FIG. 10 is another example schematic flowchart of an information exchange method according to an embodiment of this application.

FIG. 10 is another schematic flowchart of an example information exchange method according to an embodiment of this application. As shown in FIG. 10, the information exchange method includes but is not limited to the following steps.

S301: The second communication apparatus generates a first frame, where the first frame includes first indication information, the first indication information indicates the input information of the neural network, and the neural network corresponds to an AI-assisted rate adaptation function or an AI-assisted rate adaptation joint channel access function.

S302: The second communication apparatus sends the first frame.

Correspondingly, the first communication apparatus receives the first frame. Optionally, after receiving the first frame, the first communication apparatus replies to the second communication apparatus with acknowledgment information, for example, an acknowledgment (ACK) frame or a block acknowledgment (block ACK, BA), to acknowledge that the first frame has been received.

S303: The first communication apparatus determines, based on an indication of the first indication information in the first frame, at least one of the input information of the neural network and an input layer structure of the neural network.

Optionally, the input layer structure of the neural network includes a number of neurons at an input layer, and the number of neurons at the input layer may be determined based on a number of neurons corresponding to each type of input information and a number of pieces of/a length of input information of the neural network. For example, it is assumed that there are two types of input information indicated by the first indication information, which are respectively identified by x1 and x2, a number of neurons corresponding to each of x1 and x2 is 1, and the number of pieces of/the length of input information of the neural network is T. In this case, the number of neurons at the input layer is 2T, that is, the number of neurons at the input layer=a sum of numbers of neurons corresponding to all input information indicated by the first indication information*the number of pieces of input information of the neural network.

The number of neurons corresponding to each type of input information may be preset, or may be indicated in the first frame. For an indication manner, refer to the following descriptions. The number of pieces of/the length of input information of the neural network may be preset, or may be indicated in the first frame. For an indication manner, refer to the following descriptions. Therefore, after receiving the first frame, the first communication apparatus may determine, based on the indication of the first indication information in the first frame, at least one of the input information of the neural network and the input layer structure of the neural network.

The neural network in this embodiment corresponds to the AI-assisted rate adaptation function or the AI-assisted rate adaptation joint channel access function. For details, refer to related descriptions in Embodiment 1. Details are not described herein again.

Optionally, the input information of the neural network may be classified into two types. One type may be referred to as basic observation information, and the other type may be referred to as extended observation information. It should be understood that the two types of input information may also have other names, for example, first type information and second type information. This is not limited in this embodiment. The basic observation information may include one or more of the following: a carrier sense result, received power, an MCS used for a data packet, a number of multiple input multiple output (MIMO) data streams, a channel bandwidth, a queuing delay, an access delay, channel access behavior, a data packet transmission result, or channel information. The extended observation information may include one or more of the following: a packet loss rate, a throughput, or a duration from the current moment to the time of previous successful transmission of the first communication apparatus.

Certainly, the input information of the neural network may not be classified, that is, the input information of the neural network includes one or more of the following: a carrier sense result, received power, an MCS used for a data packet, a number of MIMO data streams, a channel bandwidth, a queuing delay, an access delay, channel access behavior, a data packet transmission result, channel information, a packet loss rate, a throughput, or a duration between a current moment and time of previous successful transmission of the first communication apparatus. Whether the input information of the neural network is classified is not limited in this embodiment of this application.

Optionally, the first indication information may indicate the input information of the neural network, may indicate information included in the input layer of the neural network, or may indicate observation information included in an input of the neural network.

Optionally, in addition to the first indication information, the first frame may further include second indication information. The second indication information may indicate the number of pieces of input information of the neural network, or may indicate a number of pieces of or a length of input information of the neural network within a predetermined duration. The second indication information may be further understood as indicating a historical number of pieces of input information included in the neural network, a total length of the input information, or a length of each type of input information. For example, it is assumed that the input information indicated by the first indication information is a carrier sense result and received power, and a number or a length indicated by the second indication information is T. In this case, a total of T carrier sense results and T pieces of received power are required for an input of the neural network. For another example, it is assumed that the input information indicated by the first indication information is a carrier sense result and received power, and a number or a length indicated by the second indication information is T1 and T2 respectively. In this case, T1 carrier sense results and T2 pieces of received power are required for an input of the neural network. For another example, it is assumed that the input information indicated by the first indication information is a carrier sense result and received power, and a total historical number or a total length indicated by the second indication information is T. In this case, [T/2] carrier sense results and [T/2] pieces of received power are required for an input of the neural network. The symbol "[x]" herein indicates that a rounding operation is performed on x, and T, T1, and T2 may be determined based on the predetermined duration.

Optionally, the first frame may further include information A that indicates a dimension of the input information or indicates a number of neurons corresponding to the input information. The dimension of the input information may be equal to the number of neurons corresponding to the input information. For example, if the dimension of input information is two dimensions, the number of neurons corresponding to the input information is also two. In an example, the information A may indicate a dimension of each type of input information or a number of neurons corresponding to each type of input information. It is assumed that the input information indicated by the first indication information is a carrier sense result and received power. In this case, the information A indicates that a dimension (or a corresponding number of neurons) of the carrier sense result is 2, and a dimension (or a corresponding number of neurons) of the received power is 1. In another example, to simplify an indication of the information A or reduce a number of bits of the information A, it is predefined that dimensions of types of input information are equal or numbers of neurons corresponding to types of input information are equal. In this case, the information A may indicate a dimension of any type of input information or a number of neurons corresponding to the any type of input information. It is assumed that the input information indicated by the first indication information is a carrier sense result and received power, and a dimension or a number of neurons indicated by the information A is 4. In this case, both a dimension of the carrier sense result and a dimension of the received power are four dimensions, or both a number of neurons corresponding to the carrier sense result and a number of neurons corresponding to the received power are four.

Optionally, the first frame may further include information B that indicates whether the first indication information exists. If the input information of the neural network is classified into two types: one type is basic observation information, and the other type is extended observation information, the information B may include two parts that are denoted as information B1 and information B2. The information B1 may indicate whether the basic observation information exists, and the information B2 may indicate whether the extended observation information exists.

Optionally, one or more of the first indication information, the second indication information, the information A, or the information B may be carried in a same information element or A-control subfield in the first frame, or may be carried in different information elements or A-control subfields in the first frame. This is not limited in this embodiment. The information element herein may be newly defined. The first frame may be a newly defined frame, or may be a frame that reuses a previous standard. This is not limited in this embodiment. When the first frame is the frame that reuses the previous standard, that the information B indicates that the first indication information exists may be understood as follows: The first frame is used to implement a function (or an extended function) in this embodiment; and that the information B indicates that the first indication information does not exist may be understood as follows: The first frame maintains an original function (that is, a function in the previous standard). Certainly, when the information B indicates that the first indication information does not exist, the first frame may not include at least one of the information A or the second indication information.

Figure 11:
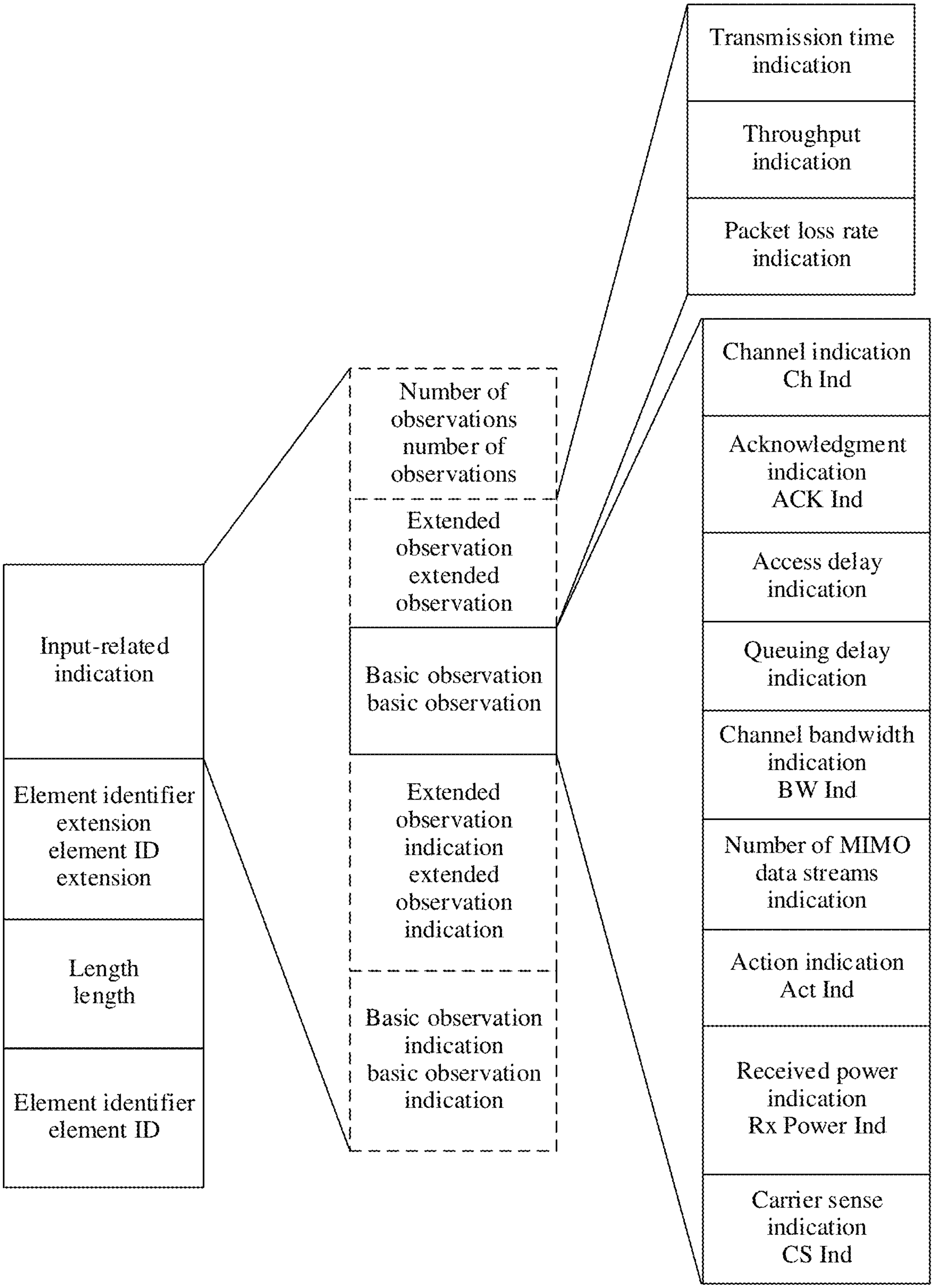
FIG. 11 is a diagram of another example frame format of an information element according to an embodiment of this application.

In an example, the input information of the neural network is classified into the basic observation information and the extended observation information. FIG. 11 is a diagram of another frame format of an information element according to an embodiment of this application. As shown in FIG. 11, the information element includes but is not limited to an element identifier (element ID) field, a length field, an element identifier extension (element ID extension) field, and an input-related indication field. The input-related indication field includes a basic observation field, and optionally further includes one or more of the following fields: a basic observation indication field (namely, the foregoing information B1), an extended observation field (namely, the foregoing information B2), an extended observation field, or a number of observations field (namely, the foregoing second indication information). The first indication information may be implemented by using the basic observation field. If the extended observation field exists, the first indication information may alternatively be implemented by using both the basic observation field and the extended observation field.

The basic observation field indicates basic observation information included in the input information of the neural network. The basic observation field includes but is not limited to one or more of the following subfields: a carrier sense (CS) indication (CS Ind) subfield, a received power indication (Rx Power Ind) subfield, an action indication (Act Ind) subfield, a number of MIMO data streams indication subfield, a channel bandwidth (BW) indication (BW Ind) subfield, a queuing delay indication subfield, an access delay indication subfield, an acknowledgment (ACK) indication (ACK Ind) subfield, or a channel (Ch) indication (Ch Ind) subfield. The Act Ind subfield indicates whether an input of the neural network includes action information, and the action information herein corresponds to an AI-assisted related function that is enabled. If the AI-assisted rate adaptation function is enabled, the Act Ind subfield indicates whether the input of the neural network includes an MCS used for a data packet. If the AI-assisted rate adaptation joint channel access function is enabled, the Act Ind subfield indicates whether the input of the neural network includes an MCS used for a data packet and channel access behavior.

The CS Ind subfield, the Rx Power Ind subfield, the number of MIMO data streams indication subfield, the BW Ind subfield, the queuing delay indication subfield, the access delay indication subfield, the ACK Ind subfield, and the Ch Ind subfield respectively indicate whether the input information of the neural network includes: a carrier sense result, received power, a number of MIMO data streams, a channel bandwidth, a queuing delay, an access delay, a data packet transmission result, and channel information.

The extended observation field indicates extended observation information included in the input information of the neural network. The extended observation information may be information inferred by a node based on the basic observation information. The extended observation field includes but is not limited to one or more of the following subfields: a packet loss rate indication subfield, a throughput indication field, or a transmission time indication field. The packet loss rate indication subfield, the throughput indication subfield, and the transmission time indication subfield respectively indicate whether the input information of the neural network includes a packet loss rate, a throughput, and a duration from a current moment to time of previous successful transmission of the first communication apparatus.

It may be understood that the basic observation field may also be understood as a bitmap, and one bit corresponds to one type of basic observation information. When a bit is set to 1, it indicates that the input information of the neural network includes basic observation information corresponding to the bit. Similarly, the extended observation field may also be understood as a bitmap, and one bit corresponds to one type of extended observation information. Whether a value being set to 1 or 0 indicates that one type of extended observation information is included is not limited in this embodiment.

The basic observation indication field (namely, the foregoing information B1) indicates whether the basic observation field is included. In this embodiment, that the basic observation indication field is set to a first value indicates that the basic observation field is included. For example, the first value herein is 1, or the first value is 0.

The extended observation indication field (namely, the foregoing information B2) indicates whether the extended observation field is included. When the extended observation indication field is set to a first value, it indicates that the extended observation field is included. When the extended observation indication field is set to a second value, it indicates that the extended observation field is not included. The first value is 1, and the second value is 0; or the first value is 0, and the second value is 1.

It may be understood that, in this embodiment, the input information of the neural network is classified into the basic observation information and the extended observation information for hierarchical indication. This reduces signaling overheads. For example, if only inference and decision-making need to be performed based on the basic observation information in an AI-assisted function (for example, the AI-assisted rate adaptation function), the extended observation indication field is set to the second value (for example, 0), and the extended observation field may be omitted.

The number of observations field (namely, the foregoing second indication information) indicates a number (that is, a number of pieces of) or a length of input information of the neural network within a predetermined duration. In other words, the number of observations field indicates a historical number of pieces of observation information included in an input of the neural network.

Figure 12:
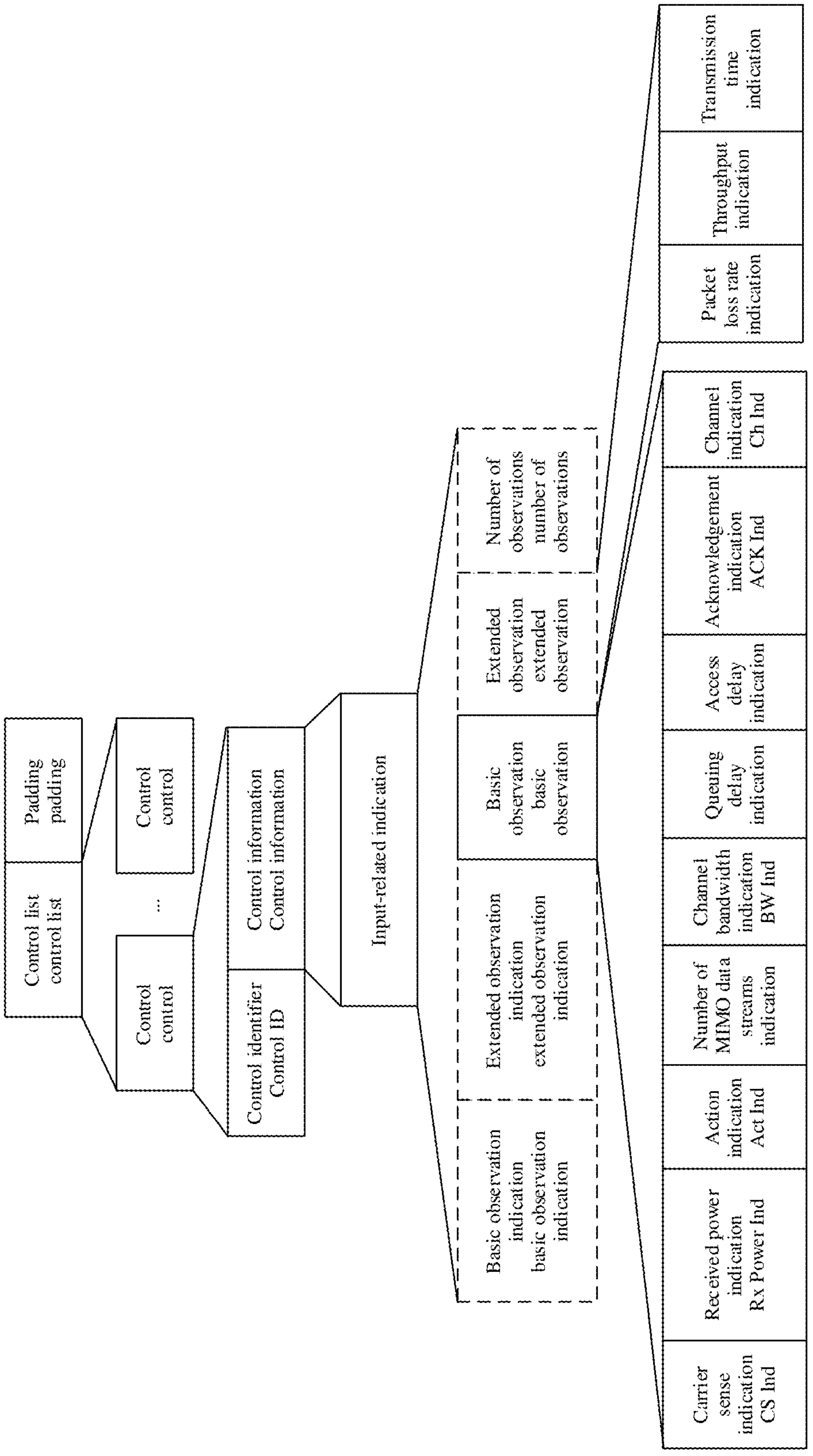
FIG. 12 is a diagram of another example frame format of an A-control subfield according to an embodiment of this application.

In another example, the input information of the neural network is still classified into the basic observation information and the extended observation information. FIG. 12 is a diagram of another frame format of an A-control subfield according to an embodiment of this application. As shown in FIG. 12, the A-control subfield includes but is not limited to an input-related indication field. For an implementation of the input-related indication field, refer to FIG. 11. Details are not described herein again.

It should be understood that names of the fields or subfields included in FIG. 11 and FIG. 12 are merely examples, and the fields or subfields may have other names. This is not limited in this embodiment. It should be further understood that arrangement orders of the fields in FIG. 11 and FIG. 12 are merely examples. This is not limited in this embodiment.

Optionally, the first frame may further include a parameter of the neural network. Alternatively, the method shown in FIG. 10 further includes: The second communication apparatus sends the parameter of the neural network. The parameter of the neural network includes at least one of a bias and a weight that are of a neuron. Alternatively, the first frame includes a part of parameters of the neural network, for example, the weight of the neuron; and the other part of the parameters, for example, the bias of the neuron, is separately sent by the second communication apparatus (that is, is not carried in the first frame for sending).

Optionally, the first frame may further include fourth indication information that indicates a hidden layer structure of the neural network. Alternatively, the method shown in FIG. 10 further includes: The second communication apparatus sends the fourth indication information, to indicate the hidden layer structure of the neural network. For the hidden layer structure of the neural network and a specific indication manner of the fourth indication information, refer to related descriptions in Embodiment 2. Details are not described herein again. Alternatively, the first frame includes a part of the hidden layer structure of the neural network, and the other part of the hidden layer structure is separately sent by the second communication apparatus (that is, is not carried in the first frame for sending).

It may be understood that when this embodiment is combined with Embodiment 2, because the function request information in Embodiment 2 may be carried in a newly defined information element, the indication information (one or more of the first indication information, the second indication information, the information A, or the information B) in this embodiment may also be carried in a newly defined information element. Therefore, element identifiers (element IDs) of the two information elements (FIG. 8 and FIG. 11) may share one identification system, that is, the element IDs of the two information elements cannot be the same. Certainly, the element IDs of the two information elements may alternatively use different identification systems, that is, the element IDs of the two information elements are allowed to be the same. When the element IDs of the two information elements are the same, functions of the two information elements may be distinguished by using a transmit end. For example, if the transmit end is the first communication apparatus, it indicates that an information element carries the function request information; or if the transmit end is the second communication apparatus, it indicates that an information element carries the indication information mentioned in this embodiment.

A control identifier (control ID) in the A-control subfield is similar to an element ID. To be specific, the control ID shown in FIG. 12 in this embodiment and the control ID shown in FIG. 9 in Embodiment 2 may share one identification system, or may use different identification systems.

It may be further understood that, when this embodiment is combined with Embodiment 2, the function response information in Embodiment 2 and the indication information (one or more of the first indication information, the second indication information, the information A, or the information B) in this embodiment may be carried in a same frame, or certainly, may be carried in different frames. If the function response information and the indication information in this embodiment are carried in a same frame, the function response information and the indication information may be specifically carried in a same information element or A-control subfield, or may be carried in different information elements or A-control subfields. Alternatively, one of the function response information and the indication information may be carried in an information element, and the other may be carried in an A-control subfield. For example, the function response information is carried in the information element, and the indication information in this embodiment is carried in the A-control subfield. This is not limited in this embodiment.

In this embodiment, a newly defined information element or an A-control subfield is used to exchange input-related information of the neural network. This provides a basis for the first communication apparatus to implement AI-assisted rate adaptation or AI-assisted rate adaptation joint channel access.

Embodiment 4

Embodiment 4 mainly describes a frame format indicated by output information (including but not limited to an output layer structure of a neural network, a manner of selecting a decision result of the neural network, or the like), that is, how a first communication apparatus and a second communication apparatus reach an agreement on the output information of the neural network.

Optionally, Embodiment 4 may be implemented in combination with one or more of Embodiment 1 to Embodiment 3, or may be implemented separately. This is not limited in this application.

Figure 13:
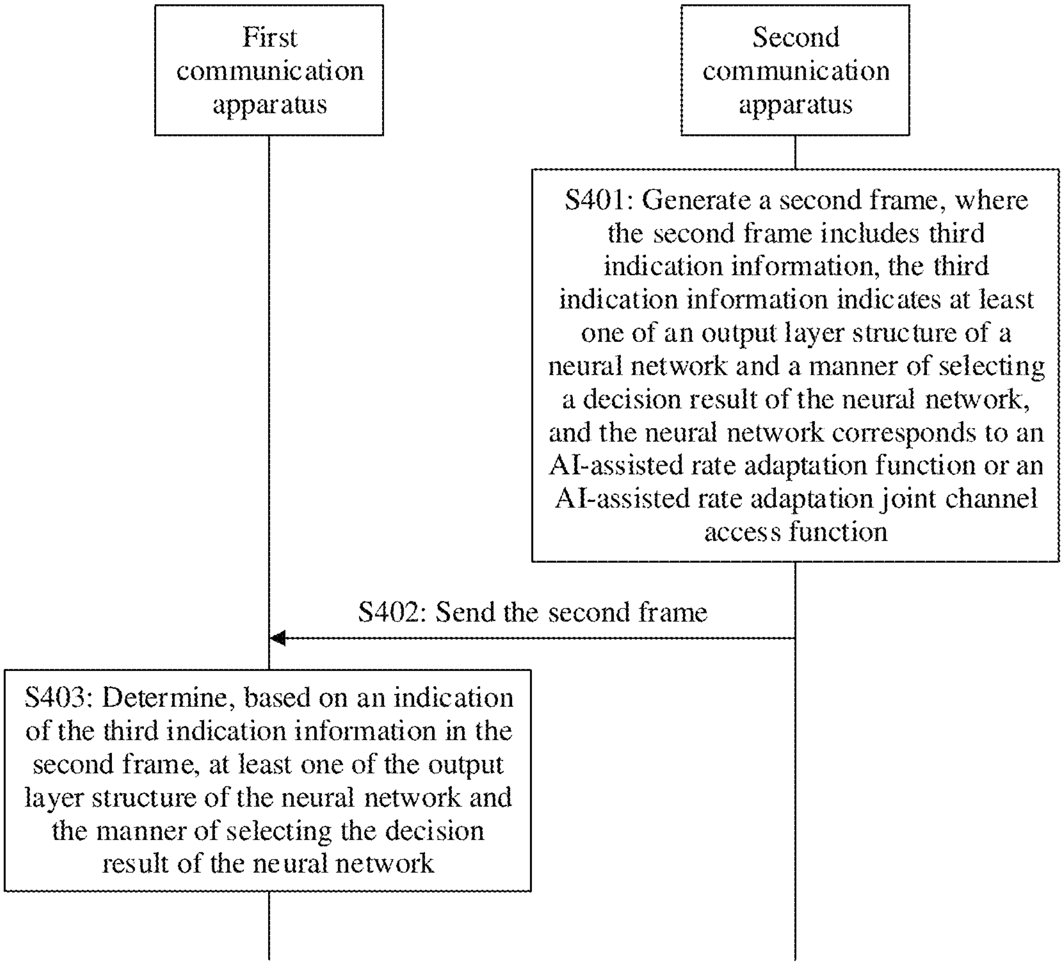
FIG. 13 is still another example schematic flowchart of an information exchange method according to an embodiment of this application.

FIG. 13 is still another schematic flowchart of an example information exchange method according to an embodiment of this application. As shown in FIG. 13, the information exchange method includes but is not limited to the following steps.

S401: The second communication apparatus generates a second frame, where the second frame includes third indication information, the third indication information indicates at least one of the output layer structure of the neural network and the manner of selecting the decision result of the neural network, and the neural network corresponds to an AI-assisted rate adaptation function or an AI-assisted rate adaptation joint channel access function.

S402: The second communication apparatus sends the second frame.

Correspondingly, the first communication apparatus receives the second frame. Optionally, after receiving the second frame, the first communication apparatus replies with acknowledgment information, for example, an ACK or a BA, to the second communication apparatus, to acknowledge that the second frame has been received.

S403: The first communication apparatus determines, based on an indication of the third indication information in the second frame, at least one of the output layer structure of the neural network and the manner of selecting the decision result of the neural network.

The neural network in this embodiment corresponds to the AI-assisted rate adaptation function or the AI-assisted rate adaptation joint channel access function. For details, refer to related descriptions in Embodiment 1. Details are not described herein again.

Optionally, the output layer structure of the neural network may include one or more of the following: a number of neurons at an output layer or an activation function used by a neuron at the output layer.

Optionally, the manner of selecting the decision result of the neural network may be understood as a manner of selecting the decision result from an output result of the neural network. For example, the manner of selecting the decision result of the neural network is selecting a result corresponding to a maximum value of the output layer of the neural network or randomly selecting a result based on a probability. For example, it is assumed that the neural network corresponds to the AI-assisted rate adaptation function, the number of neurons at the output layer of the neural network is 4, each neuron corresponds to one rate adaptation result, and the activation function at the output layer is a normalized exponential function (Softmax). In this case, an output of the neural network is probability distribution, that is, an output value p_i of each neuron i satisfies p_1+p_2+p_3+p_4=1. Therefore, two manners of selecting the decision result are respectively selecting a rate adaptation result corresponding to a maximum value p_i or randomly selecting a rate adaptation result based on distribution of p_1, p_2, p_3, and p_4.

Optionally, the third indication information may be carried in a newly defined information element in the second frame, or may be carried in an A-control subfield in the second frame. The second frame may be a newly defined frame, or may be a frame that reuses a previous standard. This is not limited in this embodiment. If the second frame is the frame that reuses the previous standard, the second frame may further include indication information used to distinguish whether the second frame maintains an original function or implements an extended function (that is, a function in this embodiment). In addition, if the second frame is the frame that reuses the previous standard, the third indication information may alternatively be carried in a reserved field in the second frame (if there is the reserved field in the second frame).

Figure 14:
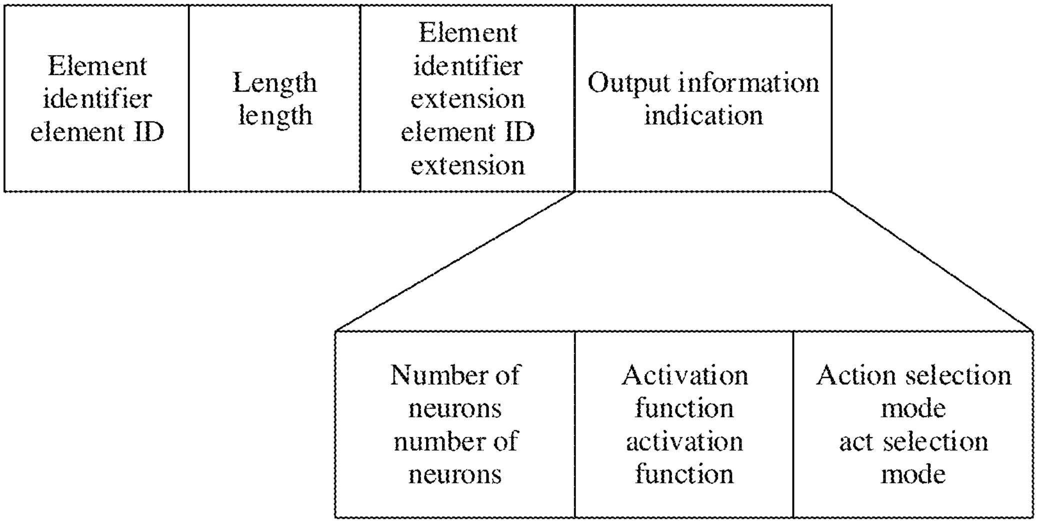
FIG. 14 is a diagram of still another example frame format of an information element according to an embodiment of this application.

For example, FIG. 14 is a diagram of still another example frame format of an information element according to an embodiment of this application. As shown in FIG. 14, the information element includes but is not limited to an element identifier (element ID) field, a length field, an element identifier extension (element ID extension) field, and an output information indication field (namely, the foregoing third indication information). The output information indication field includes but is not limited to one or more of the following fields: a number of neurons field, an activation function field, and an action selection mode (act selection mode) field.

The number of neurons field indicates the number of neurons at the output layer, and the activation function field indicates the activation function used by the neuron at the output layer. The activation function herein includes but is not limited to a linear function, a rectified linear unit (ReLU), a normalized exponential function (Softmax), or the like. For a specific function expression, refer to the conventional technology. It may be understood that, because not using an activation function is equivalent to using a linear activation function, when the activation function field indicates that the activation function used by the neuron at the output layer neuron is Linear, it may be understood that the neuron at the output layer does not use an activation function.

The act selection mode field indicates the manner of selecting the decision result of the neural network.

Figure 15:
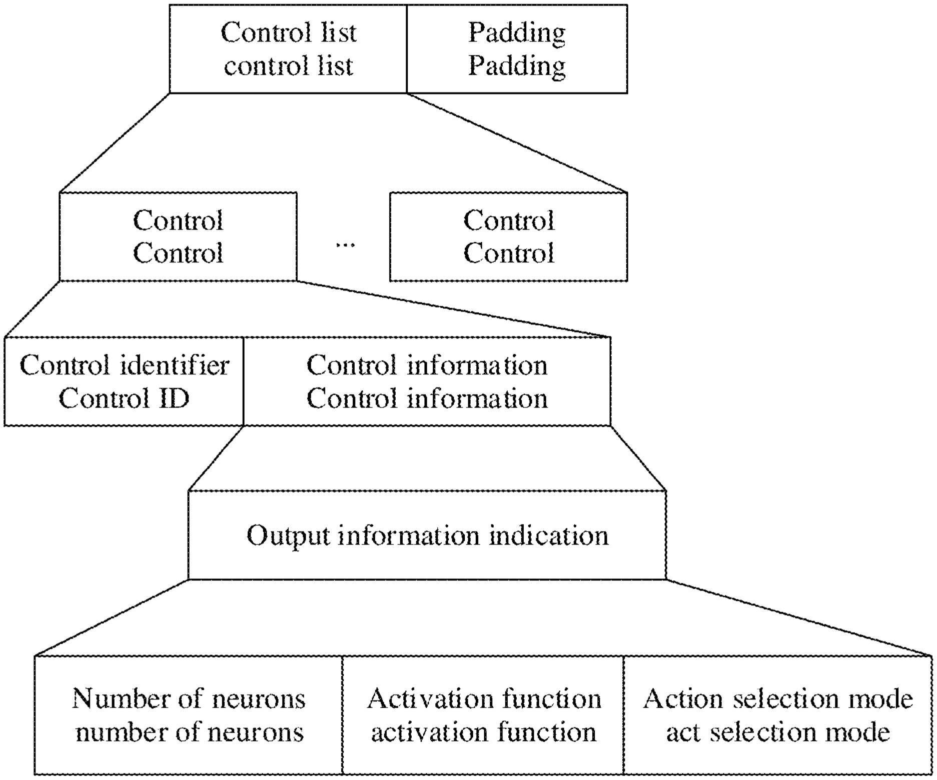
FIG. 15 is a diagram of still another example frame format of an A-control subfield according to an embodiment of this application.

In another example, FIG. 15 is a diagram of still another example frame format of an A-control subfield according to an embodiment of this application. As shown in FIG. 15, the A-control subfield includes but is not limited to an output information indication field (namely, the foregoing third indication information). For implementation of the output information indication field, refer to FIG. 14. Details are not described herein again.

It should be understood that names of the fields or subfields included in FIG. 14 and FIG. 15 are merely examples, and the fields or subfields may have other names. This is not limited in this embodiment. It should be further understood that arrangement orders of the fields in FIG. 14 and FIG. 15 are merely examples. This is not limited in this embodiment.

Optionally, the second frame may further include a parameter of the neural network. Alternatively, the method shown in FIG. 13 further includes: The second communication apparatus sends the parameter of the neural network. The parameter of the neural network includes at least one of a bias and a weight that are of a neuron. Alternatively, the second frame includes a part of parameters of the neural network, for example, the weight of the neuron; and the other part of the parameters, for example, the bias of the neuron, is separately sent by the second communication apparatus (that is, is not carried in the second frame for sending).

Optionally, the second frame may further include fourth indication information that indicates a hidden layer structure of the neural network. Alternatively, the method shown in FIG. 13 further includes: The second communication apparatus sends the fourth indication information, to indicate the hidden layer structure of the neural network. For the hidden layer structure of the neural network and a specific indication manner of the fourth indication information, refer to related descriptions in Embodiment 2. Details are not described herein again. Alternatively, the second frame includes a part of the hidden layer structure of the neural network, and the other part of the hidden layer structure is separately sent by the second communication apparatus (that is, is not carried in the second frame for sending).

It may be understood that when this embodiment is combined with Embodiment 3, the element ID in FIG. 11 and the element ID in FIG. 14 may share one identification system, that is, element IDs of the two information elements cannot be the same. When this embodiment is combined with Embodiment 2, the element ID in FIG. 8 and the element ID in FIG. 14 may share one identification system, or may use different identification systems (that is, the two element IDs are allowed to be the same). When the element ID in FIG. 8 is the same as the element ID in FIG. 14, functions of the two information elements may be distinguished by using a transmit end.

A control identifier (control ID) in the A-control subfield is similar to an element ID, that is, the control ID in FIG. 12 and the element ID in FIG. 14 may share one identification system; and the control ID in FIG. 9 and the control ID in FIG. 15 may share one identification system, or may use different identification systems.

It may be further understood that when this embodiment is combined with Embodiment 3, the first frame in Embodiment 3 and the second frame in this embodiment may be a same frame. That is, input-related information of the neural network (for example, one or more of the first indication information, the second indication information, the information A, or the information B) in Embodiment 3 and the output information (namely, the third indication information) in this embodiment may be carried in one frame for exchanging. Further, the input-related information of the neural network in Embodiment 3 and the output information in this embodiment may be carried in a same information element or A-control subfield in a frame, or may be carried in different information elements or A-control subfields in a frame, or one of the input-related information of the neural network in Embodiment 3 and the output information in this embodiment may be carried in an information element, and the other may be carried in an A-control subfield. For example, the input-related information of the neural network is carried in an information element in a frame, and the output information is carried in an A-control subfield in the frame. This is not limited in this embodiment.

Certainly, the first frame and the second frame may alternatively be different frames.

Similarly, the output information (namely, the third indication information) in this embodiment and the function response information in Embodiment 2 may be carried in a same frame, or certainly, may be carried in different frames. Specifically, the output information and the function response information may be carried in a same information element or A-control subfield, or may be carried in different information elements or A-control subfields, or one of the output information and the function response information may be carried in an information element, and the other may be carried in an A-control subfield.

In this embodiment, a newly defined information element or an A-control subfield is used to exchange the output information of the neural network (for example, the output layer structure of the neural network or the manner of selecting the decision result of the neural network). This provides a basis for the first communication apparatus to implement AI-assisted rate adaptation or AI-assisted rate adaptation joint channel access.

Embodiment 5

Embodiment 5 mainly describes an example in which Embodiment 1 to Embodiment 4 are implemented together, that is, an exchanging procedure in which a first communication apparatus and a second communication apparatus reach an agreement on a function, a structure, a parameter, an input, an output, and the like of a neural network.

In this embodiment, an example in which the first communication apparatus is a STA and the second communication apparatus is an AP is used for description.

Figure 16:
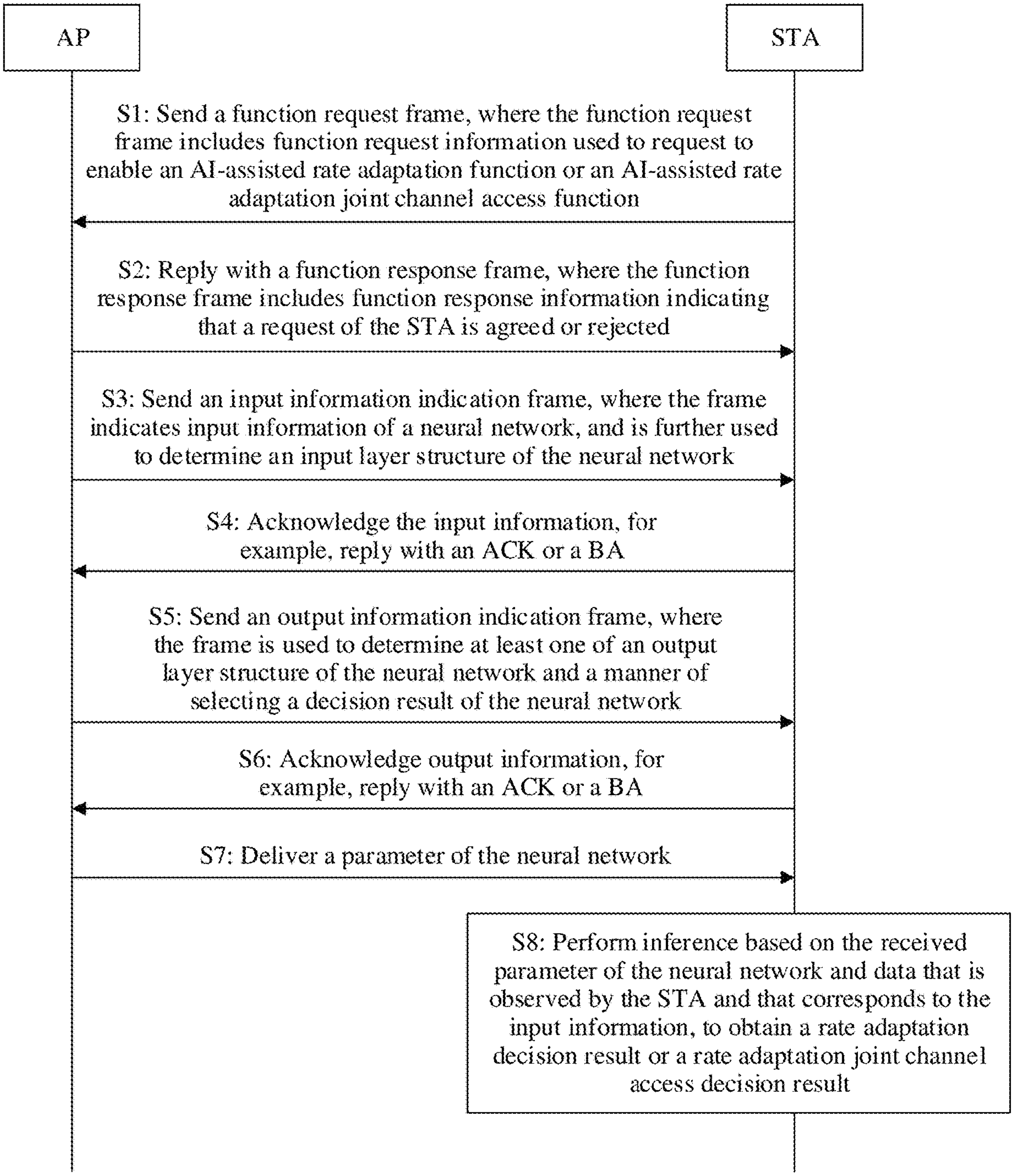
FIG. 16 is yet another schematic flowchart of an example information exchange method according to an embodiment of this application.

FIG. 16 is yet another schematic flowchart of an example information exchange method according to an embodiment of this application. As shown in FIG. 16, the information exchange method includes the following steps.

S1: The STA sends a function request frame to the AP, where the function request frame includes function request information used to request to enable an AI-assisted rate adaptation function or an AI-assisted rate adaptation joint channel access function.

Optionally, when function requests are different, inputs and outputs that are of the neural network vary.

Optionally, a trigger condition of the function request may be that a packet loss rate is greater than a preset threshold.

S2: The AP replies with a function response frame, where the function response frame includes function response information indicating that a request of the STA is agreed or rejected.

In this embodiment, the function response information indicates that the request of the STA is agreed, that is, the AP agrees the request of the STA.

For implementations of step S1 and step S2, refer to descriptions in Embodiment 2. Details are not described herein again.

S3: The AP sends an input information indication frame to the STA, where the frame indicates input information of the neural network, and is further used to determine an input layer structure of the neural network.

S4: The STA acknowledges the input information. For example, the STA replies with an ACK or a BA.

The input information indication frame herein is the first frame in Embodiment 3. For implementations of step S3 and step S4, refer to descriptions in Embodiment 3. Details are not described herein again.

S5: The AP sends an output information indication frame to the STA, where the frame is used to determine at least one of an output layer structure of the neural network and a manner of selecting a decision result of the neural network.

S6: The STA acknowledges output information. For example, the STA replies with an ACK or a BA.

The output information indication frame herein is the second frame in Embodiment 4. For implementations of step S5 and step S6, refer to descriptions in Embodiment 4. Details are not described herein again.

S7: The AP delivers a parameter of the neural network. Optionally, after the AP and the STA reach an agreement on a function, a structure, an input, and an output that are of the neural network, the AP delivers, to the STA, the parameter of the neural network that has been trained.

S8: The STA performs inference based on the received parameter of the neural network and data that is observed by the STA and that corresponds to the input information, to obtain a rate adaptation decision result or a rate adaptation joint channel access decision result.

For an implementation of step S8, refer to descriptions of step S103 in Embodiment 1. Details are not described herein again.

The STA in this embodiment requests the AP to enable an AI-assisted related function, and after the AP agrees the request of the STA, the AP sends, to the STA, related information of the neural network (an input, an output, a structure, the parameter, and the like) used to implement or support the function requested by the STA, so that the STA can use the neural network that has been trained by the AP to perform the AI-assisted related function, to improve performance.

The foregoing content describes in detail methods provided in this application. To facilitate implementation of the foregoing solutions in embodiments of this application, embodiments of this application further provide corresponding apparatuses or devices.

In this application, a communication apparatus is divided into functional modules based on the foregoing method embodiments. For example, the communication apparatus may be divided into functional modules corresponding functions, or two or more functions may be integrated into one processing module. The integrated module may be implemented in a form of hardware, or may be implemented in a form of a software functional module. It should be noted that, in this application, division into the modules is an example, and is merely a logical function division. In actual implementation, another division manner may be used. The following describes in detail communication apparatuses in embodiments of this application with reference to FIG. 17 to FIG. 19.

Figure 17:
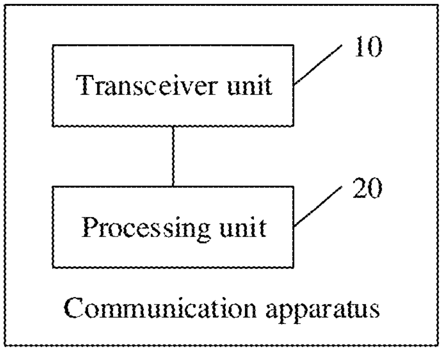
FIG. 17 is a diagram of an example structure of a communication apparatus according to an embodiment of this application.

FIG. 17 is a diagram of a structure of an example communication apparatus according to an embodiment of this application. As shown in FIG. 17, the communication apparatus includes a transceiver unit 10 and a processing unit 20.

In some embodiments of this application, the communication apparatus may be the first communication apparatus shown above. To be specific, the communication apparatus shown in FIG. 17 may be configured to perform steps, functions, or the like performed by the first communication apparatus in the foregoing method embodiments. For example, the first communication apparatus may be a station device, a chip, or the like. This is not limited in this embodiment.

In an example embodiment, the transceiver unit 10 is configured to: send function request information, and receive function response information.

For example, the processing unit 20 is configured to: generate the function request information, and send the function request information by using or controlling the transceiver unit 10.

In a possible implementation, when the function response information indicates that a request of the function request information is agreed, the transceiver unit 10 is further configured to receive at least one of a first frame, a second frame, or a parameter of a neural network.

For example, the processing unit 20 is further configured to perform AI-assisted rate adaptation, AI-assisted rate adaptation joint channel access, or the like based on at least one of the first frame, the second frame, or the parameter of the neural network.

It may be understood that for specific descriptions of the function request information, the function response information, the first frame, the second frame, the parameter of the neural network, and the like, refer to the foregoing method embodiments. Details are not described herein again.

It may be understood that specific descriptions of the transceiver unit and the processing unit shown in this embodiment are merely examples. For specific functions, steps, or the like of the transceiver unit and the processing unit, refer to the foregoing method embodiments (for example, FIG. 7 and FIG. 16).

In another example embodiment, the transceiver unit 10 is configured to receive a first frame, and the processing unit 20 is configured to determine, based on an indication of first indication information in the first frame, at least one of input information of a neural network and an input layer structure of the neural network.

In a possible implementation, the transceiver unit 10 is further configured to receive at least one of the second frame or a parameter of the neural network.

For example, the processing unit 20 is further configured to perform AI-assisted rate adaptation, AI-assisted rate adaptation joint channel access, or the like based on at least one of the first frame, the second frame, or the parameter of the neural network.

It may be understood that for specific descriptions of the first frame, the second frame, the parameter of the neural network, and the like, refer to the foregoing method embodiments. Details are not described herein again.

It may be understood that specific descriptions of the transceiver unit and the processing unit shown in this embodiment are merely examples. For specific functions, steps, or the like of the transceiver unit and the processing unit, refer to the foregoing method embodiments (for example, FIG. 10).

In still another example embodiment, the transceiver unit 10 is configured to receive a second frame, and the processing unit 20 is configured to determine, based on an indication of third indication information in the second frame, at least one of an output layer structure of a neural network and a manner of selecting a decision result of the neural network.

In a possible implementation, the transceiver unit 10 is further configured to receive a parameter of the neural network.

It may be understood that for specific descriptions of the second frame, the parameter of the neural network, and the like, refer to the foregoing method embodiments. Details are not described herein again.

It may be understood that specific descriptions of the transceiver unit and the processing unit shown in this embodiment are merely examples. For specific functions, steps, or the like of the transceiver unit and the processing unit, refer to the foregoing method embodiments (for example, FIG. 13).

In yet another example embodiment, the processing unit 20 is configured to obtain input information of a neural network, the processing unit 20 is further configured to: obtain a structure of the neural network, receive a parameter of the neural network by using or controlling the transceiver unit 10, and determine the neural network based on the structure and the parameter that are of the neural network, and the processing unit 20 is further configured to: obtain T monitored datasets, and input the T datasets into the neural network for processing, to obtain a rate adaptation decision result or a rate adaptation joint channel access decision result.

It may be understood that for specific descriptions of the input information, the structure, the parameter, and the like of the neural network, refer to the foregoing method embodiments. Details are not described herein again.

It may be understood that specific descriptions of the transceiver unit and the processing unit shown in this embodiment are merely examples. For specific functions, steps, or the like of the transceiver unit and the processing unit, refer to the foregoing method embodiments (for example, FIG. 5).

FIG. 17 is reused. In some other embodiments of this application, the communication apparatus may be the second communication apparatus shown above. To be specific, the communication apparatus shown in FIG. 17 may be configured to perform steps, functions, or the like performed by the second communication apparatus in the foregoing method embodiments. For example, the second communication apparatus may be an access point device, a chip, or the like. This is not limited in this embodiment.

In an example embodiment, the transceiver unit 10 is configured to: receive function request information, and send function response information.

For example, the processing unit 20 is configured to: obtain the function response information, and send the function response information by using or controlling the transceiver unit 10.

In a possible implementation, the transceiver unit 10 is further configured to send at least one of a first frame, a second frame, or a parameter of a neural network.

For example, the processing unit 20 is further configured to: obtain at least one of the first frame, the second frame, or the parameter of the neural network, and send at least one of the first frame, the second frame, or the parameter of the neural network by using or controlling the transceiver unit 10.

It may be understood that for specific descriptions of the function request information, the function response information, the first frame, the second frame, the parameter of the neural network, and the like, refer to the foregoing method embodiments. Details are not described herein again.

It may be understood that specific descriptions of the transceiver unit and the processing unit shown in this embodiment are merely examples. For specific functions, steps, or the like of the transceiver unit and the processing unit, refer to the foregoing method embodiments (for example, FIG. 7 and FIG. 16).

In another example embodiment, the processing unit 20 is configured to: generate a first frame, and send the first frame by using or controlling the transceiver unit 10.

In a possible implementation, the transceiver unit 10 is further configured to send at least one of a second frame or a parameter of a neural network.

For example, the processing unit 20 is further configured to: obtain at least one of the second frame or the parameter of the neural network, and send at least one of the second frame or the parameter of the neural network by using or controlling the transceiver unit 10.

It may be understood that for specific descriptions of the first frame, the second frame, the parameter of the neural network, and the like, refer to the foregoing method embodiments.

Details are not described herein again.

It may be understood that specific descriptions of the transceiver unit and the processing unit shown in this embodiment are merely examples. For specific functions, steps, or the like of the transceiver unit and the processing unit, refer to the foregoing method embodiments (for example, FIG. 10).

In still another example embodiment, the processing unit 20 is configured to: generate a second frame, and send the second frame by using or controlling the transceiver unit 10.

In a possible implementation, the transceiver unit 10 is further configured to send a parameter of a neural network.

For example, the processing unit 20 is further configured to: obtain the parameter of the neural network, and send the parameter of the neural network by using or controlling the transceiver unit 10.

It may be understood that for specific descriptions of the second frame, the parameter of the neural network, and the like, refer to the foregoing method embodiments. Details are not described herein again.

It may be understood that specific descriptions of the transceiver unit and the processing unit shown in this embodiment are merely examples. For specific functions, steps, or the like of the transceiver unit and the processing unit, refer to the foregoing method embodiments (for example, FIG. 13).

The foregoing describes the first communication apparatus and the second communication apparatus in this embodiment. The following describes possible product forms of the first communication apparatus and the second communication apparatus. It should be understood that any form of product having a function of the first communication apparatus in FIG. 17 or any form of product having a function of the second communication apparatus in FIG. 17 falls within the protection scope of embodiments of this application. It should be further understood that the following description is merely an example, and the product forms of the first communication apparatus and the second communication apparatus in embodiments of this application are not limited thereto.

In the communication apparatus shown in FIG. 17, the processing unit 20 may be one or more processors, and the transceiver unit 10 may be a transceiver; or the transceiver unit 10 may be a sending unit and a receiving unit, the sending unit may be a transmitter, the receiving unit may be a receiver, and the sending unit and the receiving unit are integrated into one device, for example, a transceiver. In this embodiment, the processor and the transceiver may be coupled, or the like. A connection manner between the processor and the transceiver is not limited in this embodiment.

Figure 18:
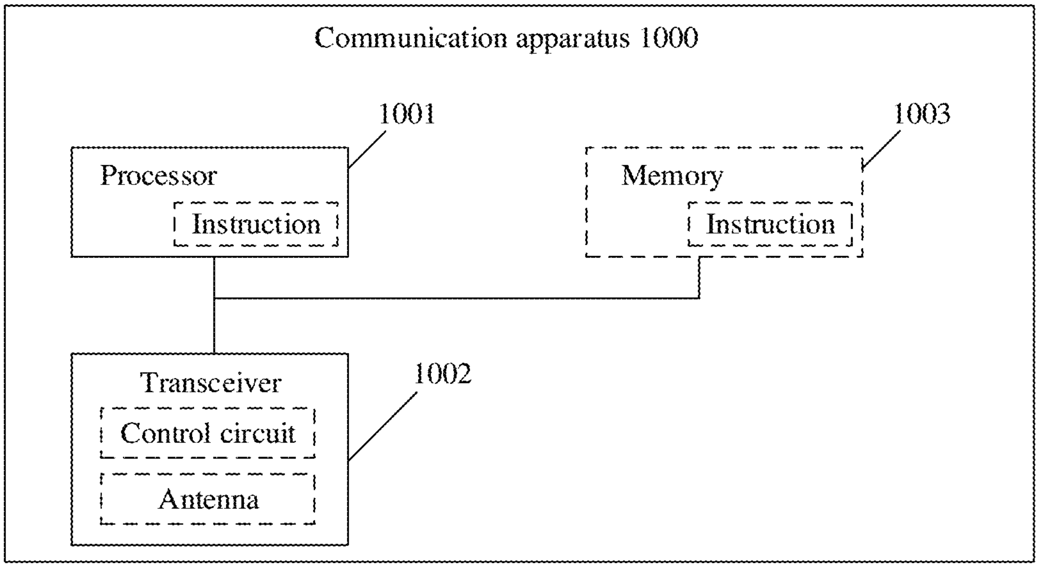
FIG. 18 is a diagram of an example structure of a communication apparatus 1000 according to an embodiment of this application.

FIG. 18 is a diagram of a structure of an example communication apparatus 1000 according to an embodiment of this application. The communication apparatus 1000 may be a first communication apparatus, a second communication apparatus, or a chip in the first communication apparatus or the second communication apparatus. FIG. 18 shows only main components of the communication apparatus 1000. In addition to the processor 1001 and the transceiver 1002, the communication apparatus may further include a memory 1003 and an input/output apparatus (not shown in the figure).

The processor 1001 is mainly configured to: process a communication protocol and communication data, control the entire communication apparatus, execute a software program, and process data of the software program. The memory 1003 is mainly configured to store the software program and the data. The transceiver 1002 may include a control circuit and an antenna. The control circuit is mainly configured to: perform conversion between a baseband signal and a radio frequency signal, and process the radio frequency signal. The antenna is mainly configured to receive/send a radio frequency signal in a form of an electromagnetic wave. The input/output apparatus, such as a touchscreen, a display, or a keyboard, is mainly configured to: receive data input by a user, and output data to the user.

After the communication apparatus is powered on, the processor 1001 may read the software program in the memory 1003, interpret and execute instructions of the software program, and process the data of the software program. When data needs to be sent in a wireless manner, the processor 1001 performs baseband processing on the to-be-sent data, and then outputs a baseband signal to a radio frequency circuit, and the radio frequency circuit performs radio frequency processing on the baseband signal, and then sends, through the antenna, a radio frequency signal in an electromagnetic wave form. When data is sent to the communication apparatus, the radio frequency circuit receives a radio frequency signal through the antenna, converts the radio frequency signal into a baseband signal, and outputs the baseband signal to the processor 1001, and the processor 1001 converts the baseband signal into data and processes the data.

In another implementation, the radio frequency circuit and the antenna may be disposed independent of the processor that performs baseband processing. For example, in a distributed scenario, the radio frequency circuit and the antenna may be remotely disposed independent of the communication apparatus.

The processor 1001, the transceiver 1002, and the memory 1003 may be connected through a communication bus.

In an example embodiment, the communication apparatus 1000 may be configured to perform functions of the first communication apparatus in Embodiment 1; the processor 1001 may be configured to perform step S101, step S102, and step S103 in FIG. 5 and/or another process of the technology described in this specification; and the transceiver 1002 may be configured to receive/send information, data, or the like required in FIG. 5, and/or may be configured to perform another process of the technology described in this specification.

In an example embodiment, the communication apparatus 1000 may be configured to perform functions of the first communication apparatus in Embodiment 2; the processor 1001 may be configured to generate the function request information sent in step S201 in FIG. 7, and/or may be configured to perform another process of the technology described in this specification; and the transceiver 1002 may be configured to perform step S201 in FIG. 7 and/or another process of the technology described in this specification.

In an example embodiment, the communication apparatus 1000 may be configured to perform functions of the second communication apparatus in Embodiment 2; the processor 1001 may be configured to generate the function response information sent in step S202 in FIG. 7, and/or may be configured to perform another process of the technology described in this specification; and the transceiver 1002 may be configured to perform step S202 and step S203 in FIG. 7 and/or another process of the technology described in this specification.

In an example embodiment, the communication apparatus 1000 may be configured to perform functions of the first communication apparatus in Embodiment 3; the processor 1001 may be configured to perform step S303 in FIG. 10 and/or another process of the technology described in this specification; and the transceiver 1002 may be configured to receive the first frame in FIG. 10, and/or may be configured to perform another process of the technology described in this specification.

In another example embodiment, the communication apparatus 1000 may be configured to perform functions of the second communication apparatus in Embodiment 3; the processor 1001 may be configured to perform step S301 in FIG. 10 and/or another process of the technology described in this specification; and the transceiver 1002 may be configured to perform step S302 in FIG. 10 and/or another process of the technology described in this specification.

In an example embodiment, the communication apparatus 1000 may be configured to perform functions of the first communication apparatus in Embodiment 4; the processor 1001 may be configured to perform step S403 in FIG. 13 and/or another process of the technology described in this specification; and the transceiver 1002 may be configured to receive the second frame in FIG. 13, and/or may be configured to perform another process of the technology described in this specification.

In another example embodiment, the communication apparatus 1000 may be configured to perform functions of the second communication apparatus in Embodiment 4; the processor 1001 may be configured to perform step S401 in FIG. 13 and/or another process of the technology described in this specification; and the transceiver 1002 may be configured to perform step S402 in FIG. 13 and/or another process of the technology described in this specification.

In an example embodiment, the communication apparatus 1000 may be configured to perform functions of the STA in Embodiment 5; the processor 1001 may be configured to perform step S8 in FIG. 16 and/or another process of the technology described in this specification; and the transceiver 1002 may be configured to perform steps S1, S4, and S6 in FIG. 16 and/or another process of the technology described in this specification.

In another example embodiment, the communication apparatus 1000 may be configured to perform functions of the AP in Embodiment 5; the processor 1001 may be configured to: generate the function response frame sent in step S2, the input information indication frame sent in step S3, and the output information indication frame sent in step S5 in FIG. 16, obtain the parameter of the neural network sent in step S7, and/or perform another process of the technology described in this specification; and the transceiver 1002 may be configured to perform steps S2, S3, S5, and S7 in FIG. 16 and/or another process of the technology described in this specification.

In any one of the foregoing designs, the processor 1001 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data, or the transceiver circuit, the interface, or the interface circuit may be configured to transmit or transfer a signal.

In any one of the foregoing designs, the processor 1001 may store instructions, the instructions may be a computer program, and the computer program is run on the processor 1001, to enable the communication apparatus 1000 to perform the method described in the foregoing method embodiments. The computer program may be solidified in the processor 1001. In this case, the processor 1001 may be implemented by hardware.

In an implementation, the communication apparatus 1000 may include a circuit, and the circuit may implement a sending, receiving, or communication function in the foregoing method embodiments. The processor and the transceiver described in this application may be implemented on an integrated circuit (IC), an analog IC, a radio frequency integrated circuit (RFIC), a mixed-signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (nMetal-oxide-semiconductor, NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

A scope of the communication apparatus described in this application is not limited thereto, and a structure of the communication apparatus may not be limited by that in FIG. 18. The communication apparatus may be an independent device or may be a part of a large device. For example, the communication apparatus may be:

(1) an independent integrated circuit IC, a chip, or a chip system or subsystem;
(2) a set including one or more ICs, where optionally, the set of ICs may further include a storage component configured to store data and a computer program;
(3) an ASIC, for example, a modem;
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or (6) others.

Figure 19:
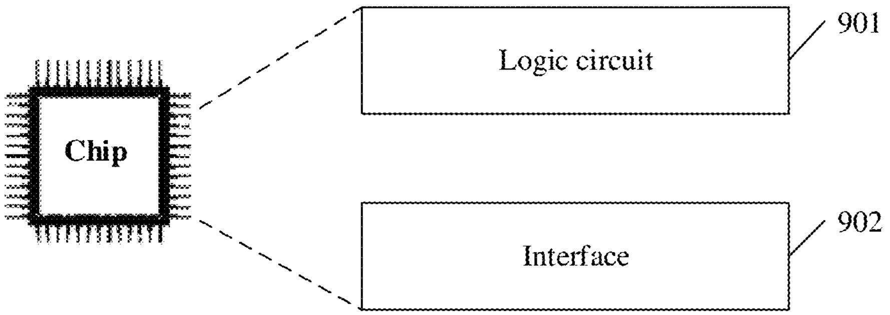
FIG. 19 is a diagram of another example structure of a communication apparatus according to an embodiment of this application.

In another possible implementation, in the communication apparatus shown in FIG. 17, the processing unit 20 may be one or more logic circuits, and the transceiver unit 10 may be an input/output interface, or may be referred to as a communication interface, an interface circuit, an interface, or the like. Alternatively, the transceiver unit 10 may be a sending unit and a receiving unit, the sending unit may be an output interface, the receiving unit may be an input interface, and the sending unit and the receiving unit are integrated into one unit, for example, an input/output interface. FIG. 19 is a diagram of another structure of a communication apparatus according to an embodiment of this application. As shown in FIG. 19, the communication apparatus shown in FIG. 19 includes a logic circuit 901 and an interface 902. That is, the foregoing processing unit 20 may be implemented by using the logic circuit 901, and the transceiver unit 10 may be implemented by using the interface 902. The logic circuit 901 may be a chip, a processing circuit, an integrated circuit, a system on chip (SoC), or the like. The interface 902 may be a communication interface, an input/output interface, a pin, or the like. For example, FIG. 19 shows an example in which the communication apparatus is a chip, and the chip includes the logic circuit 901 and the interface 902.

In this embodiment, the logic circuit and the interface may be coupled to each other. A specific manner of connection between the logic circuit and the interface is not limited in this embodiment.

For example, when the communication apparatus is configured to perform methods, functions, or steps performed by the first communication apparatus in Embodiment 1, the logic circuit 901 is configured to obtain input information of a neural network and a structure of the neural network, the interface 902 is configured to input a parameter of the neural network, the logic circuit 901 is further configured to determine the neural network based on the structure and the parameter that are of the neural network, and the logic circuit 901 is further configured to: obtain T monitored datasets, and input the T datasets into the neural network for processing, to obtain a rate adaptation decision result or a rate adaptation joint channel access decision result.

For example, when the communication apparatus is configured to perform methods, functions, or steps performed by the first communication apparatus in Embodiment 2, the logic circuit 901 is configured to obtain function request information, and the interface 902 is configured to output the function request information and input function response information.

For example, when the communication apparatus is configured to perform methods, functions, or steps performed by the second communication apparatus in Embodiment 2, the interface 902 is configured to input function request information, the logic circuit 901 is configured to obtain function response information, and the interface 902 is configured to output the function response information.

For example, when the communication apparatus is configured to perform methods, functions, or steps performed by the first communication apparatus in Embodiment 3, the interface 902 is configured to input a first frame, and the logic circuit 901 is configured to determine, based on an indication of first indication information in the first frame, at least one of input information of a neural network and an input layer structure of the neural network.

For example, when the communication apparatus is configured to perform methods, functions, or steps performed by the second communication apparatus in Embodiment 3, the logic circuit 901 is configured to generate a first frame, and the interface 902 is configured to output the first frame.

For example, when the communication apparatus is configured to perform methods, functions, or steps performed by the first communication apparatus in Embodiment 4, the interface 902 is configured to input a second frame, and the logic circuit 901 is configured to determine, based on an indication of third indication information in the second frame, at least one of an output layer structure of a neural network and a manner of selecting a decision result of the neural network.

For example, when the communication apparatus is configured to perform methods, functions, or steps performed by the second communication apparatus in Embodiment 4, the logic circuit 901 is configured to generate a second frame, and the interface 902 is configured to output the second frame.

For example, when the communication apparatus is configured to perform methods, functions, or steps performed by the STA in Embodiment 5, the logic circuit 901 is configured to generate a function request frame, the interface 902 is configured to output the function request frame, the interface 902 is further configured to input an output information indication frame, an input information indication frame, and a parameter of a neural network, and the logic circuit 901 is configured to perform inference based on a received parameter of the neural network and data that is observed by the logic circuit 901 and that corresponds to input information, to obtain a rate adaptation or rate adaptation joint channel access decision result.

For example, when the communication apparatus is configured to perform methods, functions, or steps performed by the AP in Embodiment 5, the logic circuit 901 is configured to generate a function response frame, the interface 902 is configured to output the function response frame, and the interface 902 is further configured to: output an input information indication frame, an output information indication frame, and a parameter of a neural network.

It may be understood that the communication apparatus shown in this embodiment may implement the method provided in embodiments of this application in a form of hardware, or may implement the method provided in embodiments of this application in a form of software. This is not limited in this embodiment.

It may be understood that for specific descriptions of the function request information or the function request frame, the function response information or the function response frame, the first frame, the second frame, the parameter of the neural network, and the like, refer to the foregoing method embodiments. Details are not described herein again.

For specific implementations of embodiments shown in FIG. 19, refer to the foregoing embodiments.

An embodiment of this application further provides a wireless communication system. The wireless communication system includes a first communication apparatus and a second communication apparatus. The first communication apparatus and the second communication apparatus may be configured to perform the method in any one of the foregoing embodiments.

In addition, this application further provides a computer program. The computer program is used to implement operations and/or processing performed by the first communication apparatus in the method provided in this application.

This application further provides a computer program. The computer program is used to implement operations and/or processing performed by the second communication apparatus in the method provided in this application.

This application further provides a computer-readable storage medium. The computer-readable storage medium stores computer code. When the computer code is run on a computer, the computer is enabled to perform operations and/or processing performed by the first communication apparatus in the method provided in this application.

This application further provides a computer-readable storage medium. The computer-readable storage medium stores computer code. When the computer code is run on a computer, the computer is enabled to perform operations and/or processing performed by the second communication apparatus in the method provided in this application.

This application further provides a computer program product. The computer program product includes computer code or a computer program. When the computer code or the computer program is run on a computer, operations and/or processing performed by the first communication apparatus in the method provided in this application are/is performed.

This application further provides a computer program product. The computer program product includes computer code or a computer program. When the computer code or the computer program is run on a computer, operations and/or processing performed by the second communication apparatus in the method provided in this application are/is performed.

In the several embodiments provided in this application, it should be understood that the disclosed system, apparatus, and method may be implemented in other manners. For example, the described apparatus embodiments are merely examples. For example, division into the units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on an actual requirement to implement the technical effects of the solutions provided in embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technologies, or all or some of the technical solutions may be implemented in a form of a software product. The computer software product is stored in a readable storage medium and includes a plurality of instructions for instructing a computer device (which may be a personal computer, a server, a network device, or the like) to perform all or some of the steps of the methods described in embodiments of this application. The foregoing readable storage medium includes any medium that can store program code, such as a USB flash drive, a removable hard disk, a read-only memory (ROM), a random access memory (RAM), a magnetic disk, or an optical disc.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

The invention claimed is:

1. An information exchange method, comprising:

sending, by a first communication apparatus, function request information, wherein the function request information requests to enable an artificial intelligence (AI)-assisted rate adaptation function or an AI-assisted rate adaptation joint channel access function; and receiving, by the first communication apparatus, function response information, in response to a request of the function request information, wherein the function response information indicates that the request of the function request information is agreed; and after receiving the function response information, receiving, by the first communication apparatus;

a first frame, wherein the first frame comprises first indication information indicating input information of a neural network, and the neural network corresponds to the function that is requested to be enabled by the function request information; and a parameter of th neural network, wherein the parameter of the neural network comprises a bias and/or a weight that are of a neuron, and the neural network corresponds to the function that is requested to be enabled by the function request information.

2. The method according to claim 1, wherein the input information of the neural network comprises: a carrier sense result, received power, a modulation and coding scheme (MCS) used for a data packet, a number of multiple input multiple output (MIMO) data streams, a channel bandwidth, a queuing delay, an access delay, channel access behavior, a data packet transmission result, and/or channel information, wherein the channel access behavior comprises access or non-access.

3. The method according to claim 2, wherein the input information of the neural network further comprises: a packet loss rate, a throughput, and/or a duration from a current moment to time of previous successful transmission of the first communication apparatus.

4. The method according to claim 1, wherein the first frame further comprises second indication information indicating a number of pieces of input information of the neural network.

5. The method according to claim 1, wherein the first frame further comprises information indicating a dimension of the input information.

6. The method according to claim 1, wherein after the receiving, by the first communication apparatus, function response information, the method further comprises:

receiving, by the first communication apparatus, a second frame, wherein the second frame comprises third indication information, the third indication information indicates an output layer structure of the neural network and/or a manner of selecting a decision result of the neural network, and the neural network corresponds to the function that is requested to be enabled by the function request information.

7. The method according to claim 6, wherein the output layer structure of the neural network comprises: a number of neurons and/or an activation function used by a neuron.

8. The method according to claim 1, wherein the function response information further comprises a parameter of the neural network, wherein the parameter of the neural network comprises a bias and/or a weight that are of a neuron, and the neural network corresponds to the function that is requested to be enabled by the function request information.

9. The method according to claim 1, wherein the function request information is carried in an information element, or the function request information is carried in an aggregated control subfield of a high throughput (HT) control field.

10. The method according to claim 1, wherein the function response information further comprises fourth indication information, wherein the fourth indication information indicates a hidden layer structure of the neural network, and the neural network corresponds to the function that is requested to be enabled by the function request information.

11. A first communication apparatus, wherein the apparatus comprises a processor and a transceiver, and the processor is configured to control the transceiver to perform operations comprising:

sending function request information, wherein the function request information requests to enable an artificial intelligence (AI)-assisted rate adaptation function or an AI-assisted rate adaptation joint channel access function; and receiving function response information, in response to a request of the function request information, wherein the function response information indicates that the request of the function request information is agreed; and the transceiver is further configured to, receive a first frame, wherein the first frame comprises first indication information indicating input information of a neural network, and the neural network corresponds to the function that is requested to be enabled by the function request information; and receive a parameter of the neural network, wherein the parameter of the neural network comprises a bias and/or a weight that are of a neuron, and the neural network corresponds to the function that is requested to be enabled by the function request information.

12. The first communication apparatus according to claim 11, wherein the transceiver is further configured to:

receive a second frame, wherein the second frame comprises third indication information, the third indication information indicates an output layer structure of the neural network and/or a manner of selecting a decision result of the neural network, and the neural network corresponds to the function that is requested to be enabled by the function request information.

13. A communication apparatus, wherein the communication apparatus comprises a processor and a transceiver, and the processor is configured to control the transceiver to perform operations comprising:

receiving function request information, wherein the function request information requests to enable an artificial intelligence (AI)-assisted rate adaptation function or an AI-assisted rate adaptation joint channel access function; and sending function response information, in response to a request of the function request information, wherein the function response information indicates that the request of the function request information is agreed; and the transceiver is further configured to, after sending the function response information;

send a first frame, wherein the first frame comprises first indication information indicating input information of a neural network, and the neural network corresponds to the function that is requested to be enabled by the function request information; and send a parameter the neural network, wherein the parameter of the neural network comprises a bias and/or a weight that are of a neuron and the neural network corresponds to the function that is requested to be enabled by the function request information.

14. The communication apparatus according to claim 13, wherein the transceiver is further configured to:

send a second frame, wherein the second frame comprises third indication information, the third indication information indicates an output layer structure of the neural network and/or a manner of selecting a decision result of the neural network, and the neural network corresponds to the function that is requested to be enabled by the function request information.

* * * * *